United States Patent
Walker et al.

(10) Patent No.: US 6,871,185 B2
(45) Date of Patent: *Mar. 22, 2005

(54) METHOD AND APPARATUS FOR DETERMINING WHETHER A VERBAL MESSAGE WAS SPOKEN DURING A TRANSACTION AT A POINT-OF-SALE TERMINAL

(75) Inventors: Jay S. Walker, Ridgefield, CT (US); Andrew S. Van Luchene, Norwalk, CT (US); Daniel E. Tedesco, New Canaan, CT (US); John B. Dickerson, New Canaan, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/401,409

(22) Filed: Mar. 27, 2003

(65) Prior Publication Data

US 2003/0164398 A1 Sep. 4, 2003

Related U.S. Application Data

(63) Continuation of application No. 09/135,179, filed on Aug. 17, 1998, now Pat. No. 6,567,787.

(51) Int. Cl.[7] ............................................. G06F 17/60
(52) U.S. Cl. .......................... 705/16; 705/11; 704/272; 704/275
(58) Field of Search ............................... 705/1, 11, 14, 705/16; 704/246, 272–275; 713/186; 379/265.04–265.07

(56) References Cited

U.S. PATENT DOCUMENTS

| 4,482,976 A | 11/1984 | Ishikawa .................... 364/710 |
| 4,618,936 A | 10/1986 | Shiono ...................... 364/513.5 |
| 4,760,245 A | 7/1988 | Fukaya ....................... 235/379 |
| 5,119,295 A | 6/1992 | Kapur ......................... 364/412 |
| 5,235,509 A | 8/1993 | Mueller et al. ............. 364/405 |

(List continued on next page.)

FOREIGN PATENT DOCUMENTS

| JP | 2143393 A | 6/1990 |
| JP | 6150164 | 5/1994 |
| JP | 7037170 | 2/1995 |

OTHER PUBLICATIONS

Curt, Barry, "Software review: Mail Order Manager; management software for the mail order business", Catalog Age, Apr. 1994, Section: vol. 11, No. 4, p. 95, ISSN: 0740–3119.

Calem, Robert E., "Technology; Coming to a Cash Register Near You: Multimedia", The New York Times, Jul. 31, 1994, Section 3, p. 7, col. 1, Financial Desk.

Shaffer, Richard A., "Computers with ears", Forbes, Sep. 12, 1994, Section: Computers/Communications Interactive Media; Computer Ventures; Commentary, p. 238.

(List continued on next page.)

Primary Examiner—Susanna M. Diaz
(74) Attorney, Agent, or Firm—Magdalena M. Fincham

(57) ABSTRACT

A point-of-sale terminal initiates a transaction and provides a prompt to be spoken to an operator (e.g. a cashier) of the POS terminal. The prompt indicates a verbal message that is to be spoken by the operator. The POS terminal then receives an audio signal via a microphone or similar device to record what the operator has spoken. Using speech recognition, the POS terminal determines whether the audio signal corresponds to the prompt, and thus whether the operator spoke the prompt properly. In one embodiment, the transaction is paused until the operator properly speaks the prompt. In another embodiment, the POS terminal stores an indication of whether the operator has properly spoken the prompt, thereby allowing the performance of the operator to be measured.

32 Claims, 22 Drawing Sheets

U.S. PATENT DOCUMENTS

| | | | |
|---|---|---|---|
| 5,241,649 A | 8/1993 | Niyada | 395/2 |
| 5,351,186 A | 9/1994 | Bullock et al. | 364/401 |
| 5,383,111 A | 1/1995 | Homma et al. | 364/401 |
| 5,408,210 A | 4/1995 | Oka | 340/286.06 |
| 5,426,282 A | 6/1995 | Humble | 235/383 |
| 5,482,139 A | 1/1996 | Rivalto | 186/36 |
| 5,513,250 A | 4/1996 | McAllister | 379/91 |
| 5,679,001 A * | 10/1997 | Russell et al. | 434/185 |
| 5,698,834 A | 12/1997 | Worthington et al. | 235/472 |
| 5,704,009 A | 12/1997 | Cline et al. | 395/2.84 |
| 5,758,322 A | 5/1998 | Rongley | 704/275 |
| 5,818,909 A | 10/1998 | Van Berkum et al. | 379/80 |
| 5,826,240 A | 10/1998 | Brockman et al. | 705/11 |
| 5,926,796 A | 7/1999 | Walker et al. | 705/16 |
| 6,023,688 A | 2/2000 | Ramachandran et al. | 705/44 |
| 6,317,716 B1 | 11/2001 | Braida et al. | 704/275 |

OTHER PUBLICATIONS

Raab, David M., "Package Aids Catalog Management", DM News, Apr. 22, 1996, Section: Software Review, p. 14.

"Geocapital Partners invest in Hospitality System Inc.", Business Wire, Feb. 26, 1997.

Website: "Fujitsu General Australia Pty Ltd—The G930 . . . ", (http //www fujitsugeneral com au/products/cashreg/g930 html), download date Jun. 17, 1998.

"Clarify Introduces Advanced Scripting Module With Latest Release of ClearCallCenter", PR Newswire, Jun. 16, 1998, Section: Financial News.

Website: "Windward—Quick Cash Sale", (http www windward–software com/tutorial/ms002 html), download date: Jul. 22, 1998.

"Examiner's Affidavit", Affidavit of Examiner James W. Myhre of the United States Patent and Trademark Office, Feb. 22, 2001.

* cited by examiner

| OPERATOR IDENTIFIER 320 | NAME 322 | AUTHORIZATION LEVEL 324 | NUMBER OF TRANSACTIONS 326 | NUMBER OF TRANSACTIONS IN WHICH MESSAGE SPOKEN PROPERLY 328 | % OF TIMES MESSAGE SPOKEN PROPERLY 330 | MESSAGE COMPLEXITY LEVEL 332 | VOICE FILE 334 | WEEKLY BONUS EARNED 336 |
|---|---|---|---|---|---|---|---|---|
| 18 | JOE SMITH | ALPHA | 300 | 26 | 8.7% | HIGH | FILE A | $0 |
| 19 | JANE DOE | GAMMA | 983 | 891 | 90.6% | MEDIUM | FILE B | $9.06 |
| 20 | DEAN GREEN | ALPHA | 33 | 6 | 18.2% | HIGH | FILE C | $0 |
| 21 | JOHN STEVER | BRAVO | 620 | 295 | 47.6% | LOW | FILE D | $0 |

FIG. 3

| | ITEM IDENTIFIER 420 | ITEM DESCRIPTION 422 | ITEM PRICE 424 | ITEM COST 426 |
|---|---|---|---|---|
| 402 → | 1001 | HAMBURGER | $0.89 | $0.55 |
| 404 → | 1002 | APPLE PIE | $0.89 | $0.48 |
| 406 → | 1003 | SMALL COLA | $1.19 | $0.09 |
| 408 → | 1004 | MEDIUM COLA | $1.29 | $0.09 |
| 410 → | 1005 | LARGE COLA | $1.49 | $0.09 |
| 412 → | 1006 | SMALL FRENCH FRIES | $1.09 | $0.28 |
| 414 → | 1007 | MEDIUM FRENCH FRIES | $1.69 | $0.31 |
| 416 → | 1008 | LARGE FRENCH FRIES | $1.89 | $0.33 |

|   | 502 | 504 | 506 | 508 |
|---|---|---|---|---|
|   | TRANSACTION #: 91210765 | DATE: 12/3/99 | TIME: 5:10 PM | OPERATOR: 21 |

| ITEM IDENTIFIER 520 | ITEM DESCRIPTION 522 | ITEM PRICE 524 | QUANTITY 526 |
|---|---|---|---|
| 1002 | APPLE PIE | $0.89 | 1 |
| 1001 | HAMBURGER | $0.89 | 2 |
| 1008 | LARGE FRENCH FRIES | $1.89 | 1 |

510 → (row 1)
512 → (row 2)
514 → (row 3)

516 → PROMPT(S): "WOULD YOU LIKE ANOTHER APPLE PIE?"
ACCEPTED?: NO

FIG. 5

|     | FREQUENT SHOPPER IDENTIFIER 720 | FREQUENT SHOPPER NAME 722 | FREQUENT SHOPPER STATUS 724 |
|---|---|---|---|
| 702 → | 1234567 | JEFF GOODE | NORMAL |
| 704 → | 1234568 | JAMES JURASSIC | PLATINUM |
| 706 → | 1234569 | ROBBIE ROB | GOLD |
| 708 → | 1234570 | MICK MAGDALENA | NORMAL |

FIG. 7

| SURVEY QUESTION IDENTIFIER 1436 | SURVEY QUESTION TEXT 1438 | NUMBER OF RESPONSES A 1440 | NUMBER OF RESPONSES B 1442 | NUMBER OF RESPONSES C 1444 |
|---|---|---|---|---|
| 11 111 | "HOW WAS YOUR MEAL? A = ABOVE AVERAGE, B = AVERAGE, C = BELOW AVERAGE" | 7 | 20 | 18 |
| 11 112 | "WOULD YOU RECOMMEND US TO A FRIEND? A = YES, B = NO" | 17 | 28 | 0 |

1430, 1432, 1434

FIG. 14B

METHOD AND APPARATUS FOR DETERMINING WHETHER A VERBAL MESSAGE WAS SPOKEN DURING A TRANSACTION AT A POINT-OF-SALE TERMINAL

The present Application is a Continuing Application of, commonly-owned U.S. application Ser. No. 09/135,179, now U.S. Pat. No. 6,567,787, which was filed Aug. 17, 1998 in the name of Walker et al. The entirety of this Application is hereby incorporated by reference herein for all purposes.

CROSS REFERENCE TO CO-PENDING APPLICATIONS

The present invention is related to the following United States Patent Applications: U.S. patent application Ser. No. 09/045,386 entitled "METHOD AND APPARATUS FOR CONTROLLING THE PERFORMANCE OF A SUPPLEMENTARY PROCESS AT A POINT-OF[0]-SALE TERIMAL" filed on Mar. 20, 1998 in the name of Jay S. Walker, Andrew S. Van Luchene and Dean Alderucci, and U.S. patent application Ser. No. 08/920,116 entitled "METHOD AND SYSTEM FOR PROCESSING SUPPLEMENTARY PRODUCT SALES AT A POINT-OF-SALE TERMINAL" FILED ON Aug. 26, 1997 in the name of Jay S. Walker, James A. Jorasch and Andrew S. Van Luchene and which issued as U.S. Pat. No. 6,119,099 on Sep. 12, 2000, each assigned to the assignee of the present invention and incorporated by reference herein as part of the present disclosure.

FIELD OF THE INVENTION

The present invention relates to point-of-sale terminals.

BACKGROUND OF THE INVENTION

Many businesses employ cashiers that interact with customers and handle transactions with customers. Cashiers are often directed as part of their employment to engage in various types of dialog with customers. For example, a cashier may greet a customer, verify what the customer has ordered by reading the order back to him, inquire as to whether the customer is satisfied and provide other verbal (spoken) messages to the customer. Such verbal messages are typically intended to increase customer satisfaction and/or sales.

In many business environments, an important function of a cashier is to provide verbal messages which are offers that the customer may accept or reject, such as an offer for an item the customer has not ordered. One type of offering system is a computer-determined "suggestive sell". U.S. Pat. No. 5,353,219 describes a system for selecting items that a cashier may suggest for a customer to purchase at conventional item prices. Providing offers can increase sales and thereby increase the average profit gained per transaction. In particular, if more offers are provided, the average number of acceptances of such offers will be greater.

Although the business benefits if the cashier provides the proper verbal messages to customers, the cashier typically has little incentive to do so. Accordingly, the cashier will typically provide the proper verbal messages inconsistently or not at all. It is extremely difficult or impossible to assure that the cashier has properly provided an appropriate verbal message for every transaction. For example, in the current environment a manager cannot monitor every transaction of every cashier under his supervision to assure that the cashier makes an offer or otherwise provides the proper verbal message.

It would also be advantageous to determine whether cashiers have appropriately provided verbal messages to customers and to assure that verbal messages were appropriately provided to customers.

SUMMARY OF THE INVENTION

It is an object of the present invention to provide a method and apparatus for determining whether a verbal message was spoken during a transaction at a POS terminal.

In accordance with the present invention, a point-of-sale terminal initiates a transaction and provides a prompt to be spoken to an operator (e.g. a cashier) of the POS terminal. The prompt indicates a verbal message that is to be spoken by the operator, and may be provided to the operator visually (e.g. displayed text) or aurally (e.g. sound transmitted to headphones). The POS terminal then receives an audio signal via a microphone or similar device to record what the operator has spoken. Using speech recognition, the POS terminal determines whether the audio signal corresponds to the prompt, and thus whether the operator spoke the prompt properly. In one embodiment, the transaction is paused until the operator properly speaks the prompt. In another embodiment, the POS terminal stores an indication of whether the operator has properly spoken the prompt, thereby allowing the performance of the operator to be measured.

BRIEF DESCRIPTION OF THE DRAWINGS

FIG. 3 is a schematic illustration of an operator database of the POS terminal of FIG. 2.

FIG. 4 is a schematic illustration of an inventory database of the POS terminal of FIG. 2.

FIG. 5 is a schematic illustration of a record of a transaction database of the POS terminal of FIG. 2.

FIG. 7 is a schematic illustration of a frequent shopper database of the POS terminal of FIG. 2.

FIG. 14B is a schematic illustration of a survey database of the POS terminal of FIG. 2.

DETAILED DESCRIPTION OF THE PREFERRED EMBODIMENTS

Point-of-sale ("POS") terminals are used in a wide variety of businesses for performing such processes as calculating the total price of a purchase (goods or services) and calculating the amount of change due to a customer. POS terminals may further specify a verbal message that the cashier is supposed to speak to the customer. In addition, POS terminals may also be used with an offering system in order to provide offers to customers.

If desired, a POS terminal provided in accordance with the present invention may furthermore provide a strong incentive for the operator of the POS terminal to speak an appropriate verbal message. The verbal message may be, for example, an offer, the customer's order read back to him, the customer's name or a survey question. Accordingly, the present invention may be used to enforce proper cashier behavior both before and during transactions. In addition, if operators are better directed to provide offers during each transaction, the average number of acceptances of such offers will be greater and revenues will increase.

Figure 1:
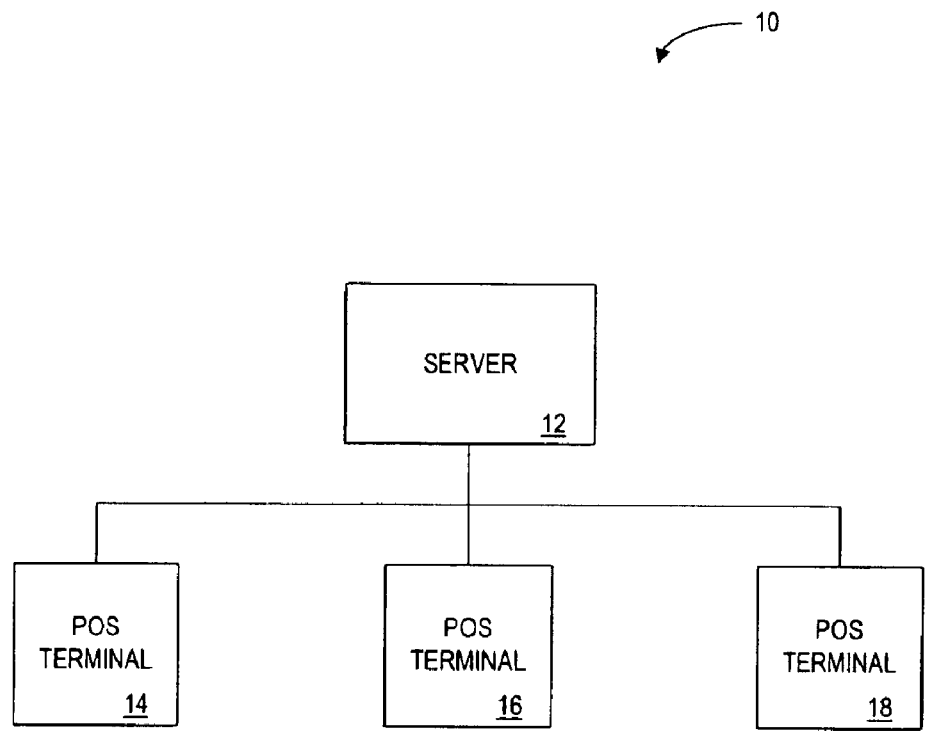
FIG. 1 is a schematic illustration of a network apparatus provided in accordance with the present invention.

Referring to FIG. 1, a network apparatus 10 includes a server 12 in communication with POS terminals 14, 16 and 18. The server 12 directs the operation of, stores data from, and transmits data to the POS terminals 14, 16 and 18. The server 12 may itself be a POS terminal, as described below, or may be another computing device that can communicate with one or more POS terminals. Although three POS terminals are shown in FIG. 1, any number of POS terminals may be in communication with the server 12 without departing from the spirit and scope of the present invention. Each of the POS terminals 14, 16 and 18 may be located in the same store, in different stores of a chain of stores, or in other locations. The server 12 may perform many of the processes described below as performed by a POS terminal, especially those processes that are performed for more than one POS terminal. The server 12 may also store data that is used by more than one POS terminal.

Figure 2:
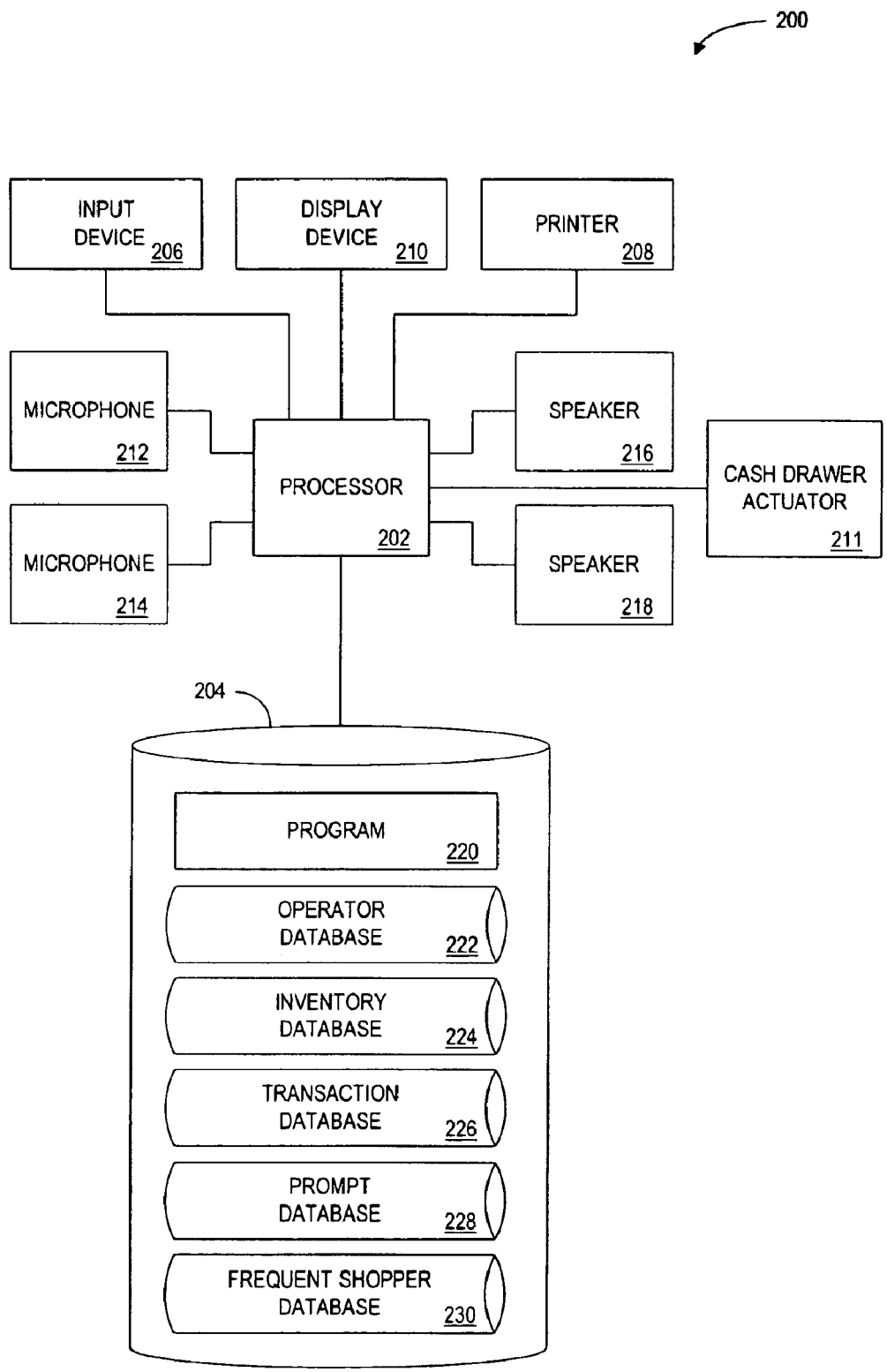
FIG. 2 is a schematic illustration of a POS terminal of the network apparatus of FIG. 1.

Referring to FIG. 2, a POS terminal 200 may be, for example, the NCR 7454 manufactured by NCR Corporation or the IBM 4683 manufactured by International Business Machines. The POS terminal 200 includes a processor 202 that comprises one or more conventional microprocessors such as the Intel® Pentium® microprocessor. The processor 202 is in communication with a data storage device 204, such as an appropriate combination of magnetic, optical and/or semiconductor memory. The processor 202 and the storage device 204 may each be (i) located entirely within a single computer or other computing device; (ii) connected to each other by a remote communication medium, such as a serial port cable, telephone line or radio frequency transceiver; or (iii) a combination thereof. For example, the POS terminal 200 may comprise one or more computers that are connected to a remote server computer for maintaining databases.

The processor 202 is also in communication with an input device 206, a printer 208 and a display device 210. The input device 206 preferably comprises a keypad for transmitting input signals, such as signals indicative of a purchase, to the processor 202. The input device 206 may comprise a card reader for reading magnetically-encoded information on cards passed therethrough, such as credit cards, frequent shopper cards and identity cards. The input device 206 may comprise an optical scanner for reading bar codes, such as bar codes registered on items of inventory. The input device 206 may comprise a touch screen for generating signals that indicate when and where the screen has been touched, pressed or actuated. The printer 208 is for registering indicia on paper or other material, thereby printing receipts, coupons and vouchers as commanded by the processor 202. The display device 210 is operative to display at least alphanumeric characters to the customer and/or cashier, and thus may be any of a number of known video monitors, liquid crystal displays ("LCD") or light emitting diode ("LED") displays. Many types of input devices, printers and display devices are known to those skilled in the art, and need not be described in detail herein.

The POS terminal 200 may also include a cash drawer (not shown) that can be driven by a cash drawer actuator 211 to an open (accessible) position from a closed (inaccessible) position. The processor 202 may send appropriate command signals to the cash drawer actuator 211 when it is desirable to drive the cash drawer to its open position (e.g. when money is to be received from a customer during a transaction). The POS terminal 200 may also include a cash drawer sensor (not shown) for transmitting signals to the processor 202 indicating whether the cash drawer is in the open position or closed position.

The processor 202 is also in communication with microphones 212 and 214. The microphones 212 and 214 are operative to receive audio signals and convert the audio signals to corresponding electrical signals for the processor 202. The processor 202 may thus process the audio signals from each of the microphones 212 and 214 in a manner described below. In one embodiment, the microphones 212 and 214 are for receiving audio signals from a cashier and a customer respectively. Accordingly, the microphones 212 and 214 could be located near the mouths of the cashier and the customer respectively.

Speakers 216 and 218 are each in communication with the processor 202. The speakers 216 and 218 each convert electrical signals received from the processor 202 to corresponding audio signals. The speakers 216 and 218 thus can generate audible sounds as directed by the processor 202. One or both of the speakers 216 and 218 may be for broadcasting sounds such that those in the general vicinity of the POS terminal 200 (e.g. the cashier and the customer) can hear the sounds. For example, a speaker may be mounted on the POS terminal 200 and be capable of generating audio signals of sufficient energy to be heard from several feet away. One or both of the speakers 216 and 218 may be in the form of an earphone that fits in the ear of the cashier, allowing only the cashier to hear the sounds generated the earphone. The processor 202 may direct the speaker 216 to generate one set of audio signals and simultaneously direct the speaker 218 to generate a different set of audio signals. For example, in an embodiment where the speaker 216 is an earphone and the speaker 218 is mounted on the POS terminal 200, the speaker 216 may generate an audio command phrase for the cashier, while the speaker 218 generates a greeting for the customer.

Appropriate means for connecting the processor 202 to the microphones 212 and 214 and speakers 216 and 218 will be apparent to those skilled in the art. Although two microphones and two speakers are depicted in FIG. 2, those skilled in the art will understand that any number of microphones and speakers may be in communication with the processor 202. There may be a plurality of microphones cooperating to function together as an omnidirectional microphone for receiving audio signals from the cashier. Omnidirectional microphones can be useful in certain types of voice-recognition applications, as is known in the art. Similarly, a plurality of speakers may be mounted on the POS terminal 200 for generating stereophonic sound, giving listeners the impression of a more natural distribution of sound. Furthermore, in an embodiment where the POS terminal 200 functions in a "drive-through" application (e.g. of a fast food restaurant), one speaker and one microphone could be embodied in a headset worn by the operator. Another speaker and another microphone would be located near a car lane and situated to transmit audio signals to and receive audio signals from the driver of a car in the car lane.

The storage device 204 stores a program 220 for controlling the processor 202. The processor 202 performs instructions of the program 220, and thereby operates in accordance with the present invention, and particularly in accordance with the methods described in detail herein. The program 220 furthermore includes program elements that may be necessary, such as an operating system and "device drivers" for allowing the processor 202 to interface with computer peripheral devices, such as the input device 206, the printer 208, the display device 210, the microphones 212 and 214 and the speakers 216 and 218. Appropriate device drivers and other necessary program elements are known to those skilled in the art, and need not be described in detail herein.

The storage device 204 also stores (i) an operator database 222, (ii) an inventory database 224, (iii) a transaction database 226, (iv) a prompt database 228, and (v) a frequent shopper database 230. In another embodiment, the server 12 (FIG. 1) may store one or more of the databases 222, 224, 226, 228 and 230. The databases 222, 224, 226, 228 and 230 are described in detail below and depicted with exemplary entries in the accompanying figures. As will be understood by those skilled in the art, the schematic illustrations and accompanying descriptions of the databases presented herein are exemplary arrangements for stored representations of information. A number of other arrangements may be employed besides the tables shown. Similarly, the illustrated entries represent exemplary information, but those skilled in the art will understand that the number and content of the entries can be different from those illustrated herein.

In other embodiments, the POS terminal is a personal computer without a cash drawer. Such an embodiment is especially advantageous in applications such as telemarketing or telephone order processing where the POS terminal need not collect or dispense money from customers.

Referring to FIG. 3, a table 300 illustrates an embodiment of the operator database 222 (FIG. 2). The table 300 includes entries 302, 304, 306 and 308, each of which describes an operator of a POS terminal. It will be understood by those skilled in the art that the table 300 may include any number of entries. The table 300 also defines fields for each of the entries 302, 304, 306 and 308, which specify (i) an operator identifier 320 for uniquely identifying the operator; (ii) a name 322 of the operator; (iii) an authorization level 324 of the operator; (iv) a number of transactions 326 in which the operator participated; (v) a number of transactions in which a verbal message was spoken properly by the operator 328; (vi) a percentage of times the verbal message was spoken properly 330, which may be determined from the quotient of the number of transactions in which a verbal message was spoken properly by the operator 328 and the number of transactions 326; (vii) a verbal message complexity level 332 that indicates the maximum complexity of the verbal message that the operator is able or allowed to speak; (viii) a voice file 334 that indicates characteristics of the operator's voice and speech patterns; and (ix) a weekly bonus earned 336 by the operator.

The authorization level 324 of the operator may be used, for example, to grant operators with different levels of access to various functions of the POS terminal. For example, it may be desirable to permit only operators with the highest level of access to void erroneous transactions, to override paused transactions, to refund money to customers and to apply promotional discounts to transactions. The voice file 334 may be used to improve the ability of the POS terminal to accurately recognize words spoken by the specified operator in a manner known to those skilled in the art.

The verbal message complexity level 332 may be used to determine which of a plurality of prompts the operator may be instructed to speak. For example, if the verbal message complexity level of the operator is "HIGH", any prompt may be selected. Similarly, if the verbal message complexity level of the operator is "MEDIUM", the first three prompts stored in the prompt database 228 (FIG. 2) may be selected and if the verbal message complexity level of the operator is "LOW" only the first prompt stored in the prompt database 228 may be selected. In such an embodiment, the first prompts would be simpler, and so more appropriate for operators that are less adept at providing complex verbal messages.

The weekly bonus earned 336 may be based on several criteria, such as the percentage of times the verbal message was spoken properly or the number of transactions in which a verbal message was spoken properly during a predetermined period of time. For example, the operator may earn $0.10 for each percentage point of the percentage of times the verbal message was spoken properly, provided the percentage of times the verbal message was spoken properly is greater than 50%. The weekly bonus can be directly added to the pay check of the operator. Accordingly, a billing system that generates pay checks would be in communication with the operator database 222 to receive the weekly bonus earned for the appropriate operator and increase the amount of the pay check accordingly. Those skilled in the art will understand that such a bonus may be provided at other intervals besides weekly.

Referring to FIG. 4, a table 400 illustrates an embodiment of the inventory database 224 (FIG. 2). The table 400 includes entries 402, 404, 406, 408, 410, 412, 414 and 416, each of which describes a type of inventory item. It will be understood by those skilled in the art that the table 400 may include any number of entries. The table 400 also defines fields for each of the entries 402, 404, 406, 408, 410, 412, 414 and 416, which specify (i) an item identifier 420 for uniquely identifying the inventory item, (ii) an item description 422, (iii) an item price 424 which is the price that customers are to be charged for one unit of the item, and (iv) an item cost 426 which is the cost that the business selling the inventory item incurs for one unit of the item.

Referring to FIG. 5, a record 500 of the transaction database 226 (FIG. 2) defines a transaction performed at a POS terminal. The transaction database 226 (FIG. 2) typically includes a plurality of records such as the record 500, each defining a different transaction. The record 500 includes a transaction identifier 502 that uniquely identifies the transaction, a date 504 when the transaction occurred, a time 506 when the transaction occurred and the operator identifier 508 that identifies the operator participating in the transaction. The record 500 also includes entries 510, 512 and 514 which each describe a type of inventory item to be purchased during the transaction. It will be understood by those skilled in the art that the record 500 may include any number of entries. The record 500 also defines fields for each of the entries 510, 512 and 514, which specify (i) an item identifier 520 that uniquely indicates the item; (ii) an item description 522; (iii) an item price 524; and (iv) a quantity 526 of the item to be purchased. For example, the record 500 indicates that one apple pie, two hamburgers and one large French fries are to be purchased during the transaction. The record 500 may also store an indication 516 of a prompt that was provided during the transaction and, if the prompt represents an offer, whether the customer accepted the offer.

Figure 6:
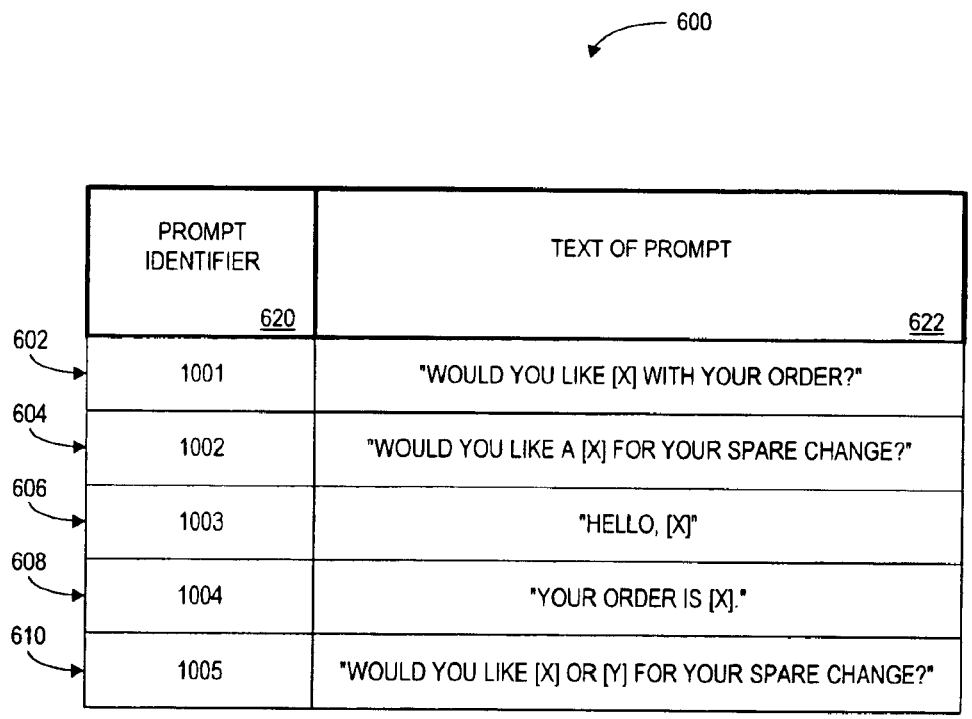
FIG. 6 is a schematic illustration of a prompt database of the POS terminal of FIG. 2.

Referring to FIG. 6, a table 600 illustrates an embodiment of the prompt database 228 (FIG. 2). The table 600 includes entries 602, 604, 606, 608 and 610, each of which describes a prompt (an indication of a verbal message that is to be spoken by a cashier or other operator of a POS terminal). It will be understood by those skilled in the art that the table 600 may include any number of entries. The table 600 also defines fields for each of the entries 602, 604, 606, 608 and 610, which specify (i) a prompt identifier 620 for uniquely identifying the prompt, and (ii) a text of the prompt 622. The text of the prompt 622 may be constant or subject to variation. For example, the entry 606 describes a prompt "Hello, [X]." The exemplary notation [X] shown in FIG. 6 indicates a variable that may be substituted with various words or phrases such as a name of the customer. A prompt may include one or more such variables, allowing prompts to be customized to a variety of situations, such as changing prices or suggestive sell offers for different products.

Referring to FIG. 7, a table 700 illustrates an embodiment of the frequent shopper database 230 (FIG. 2). The table 700 includes entries 702, 704, 706 and 708, each of which describes a frequent shopper (a party that has registered with a business). It will be understood by those skilled in the art that the table 700 may include any number of entries. The table 700 also defines fields for each of the entries 702, 704, 706 and 708 that specify (i) a frequent shopper identifier 720 for uniquely identifying the frequent shopper, (ii) a frequent shopper name 722, and (iii) a frequent shopper status 724 that indicates a rating or other measure of the frequent shopper. The frequent shopper status 724 may be based on, for example, the amount of money the frequent shopper has spent at the business, the number of visits to the business, and/or whether the frequent shopper has paid for a particular rating. The frequent shopper status may be used to determine, for example, discounts or promotional offers for which the customer is eligible.

As described above, the present invention can provide a strong incentive for the operator of the POS terminal to speak an appropriate verbal message. The POS terminal records a phrase spoken by the operator during a transaction, or otherwise receives an audio signal that represents what was spoken by the operator. The POS terminal then determines whether the audio signal satisfies a predetermined criterion, such as whether the audio signal (and thus the spoken phrase) corresponds to a prompt that the operator was provided to read aloud to the customer. Accordingly, the POS terminal may advantageously employ speech recognition to determine what words the operator spoke. The POS terminal may also analyze and take into consideration other features of a verbal message, such as the average pitch, volume and time duration of the verbal message.

The POS terminal provided in accordance with the present invention may also be used to record and determine what words were spoken by other parties such as customers. Such words and phrases may be stored and analyzed to extract desirable information therefrom.

Those skilled in the art will appreciate that there are numerous ways to implement speech recognition for use with the present invention. For example, Voice Tools, offered by Speech Solutions', Inc., is software that includes custom controls for Visual Basic, C, and C++ that allow dictation, voice control, and similar features to be added to programs using IBM's VoiceType Dictation System for Windows™. Also, SRAPI (Speech Recognition Application Program Interface) is a cross-platform application programming interface for speech recognition and text-to-speech functions supported by a consortium of developers including Novell, IBM, Intel, Philips Dictation Systems, and other companies. Such an application programming interface allows programs including voice recognition to be developed. Such programs are capable of interpreting spoken words and phrases, and various steps may be dependent on which words or phrases were spoken.

Figure 8A:
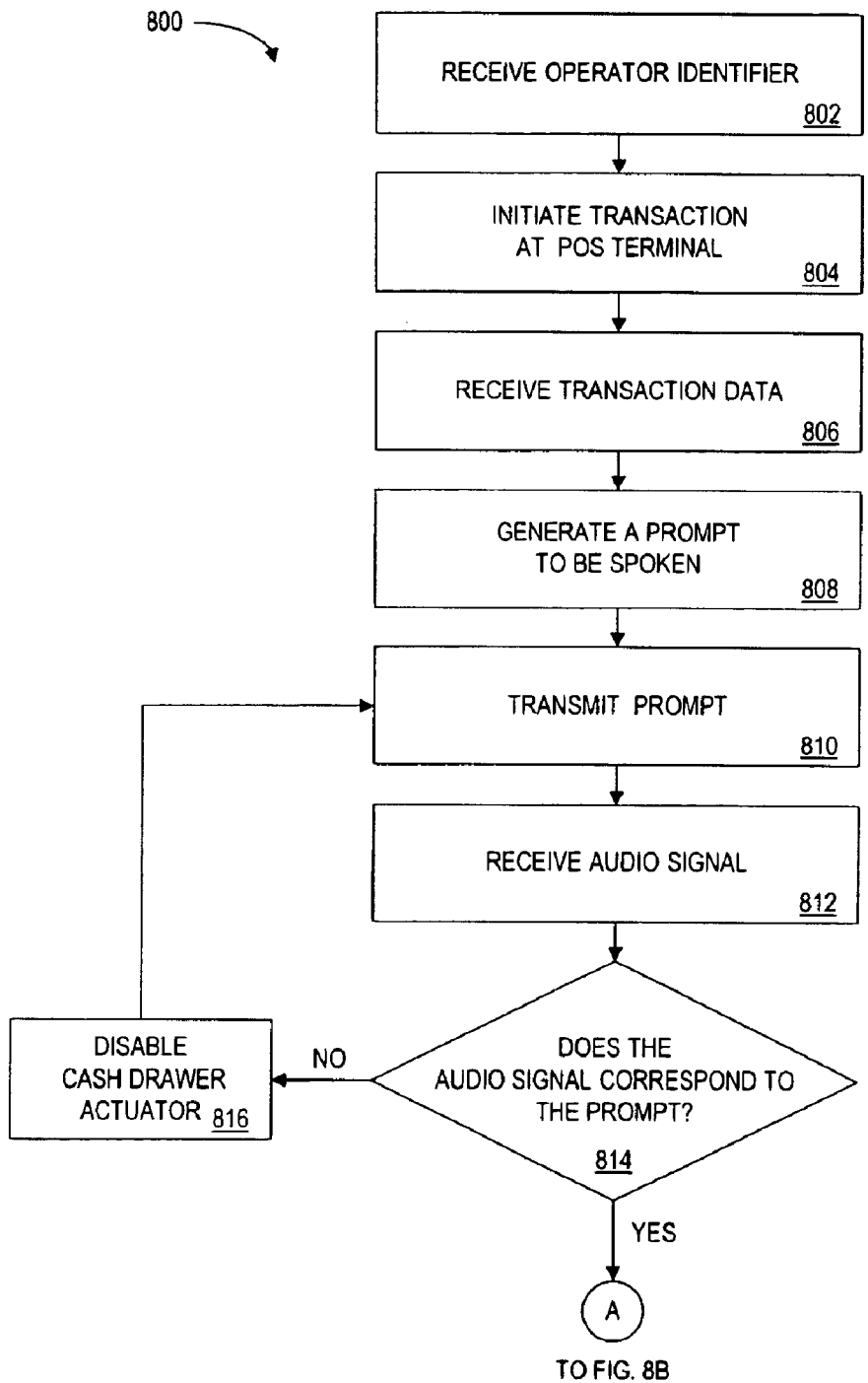
FIGS. 8A and 8B are a flow chart illustrating a method for determining whether a verbal message was spoken during a transaction at a POS terminal.
Figure 8B:
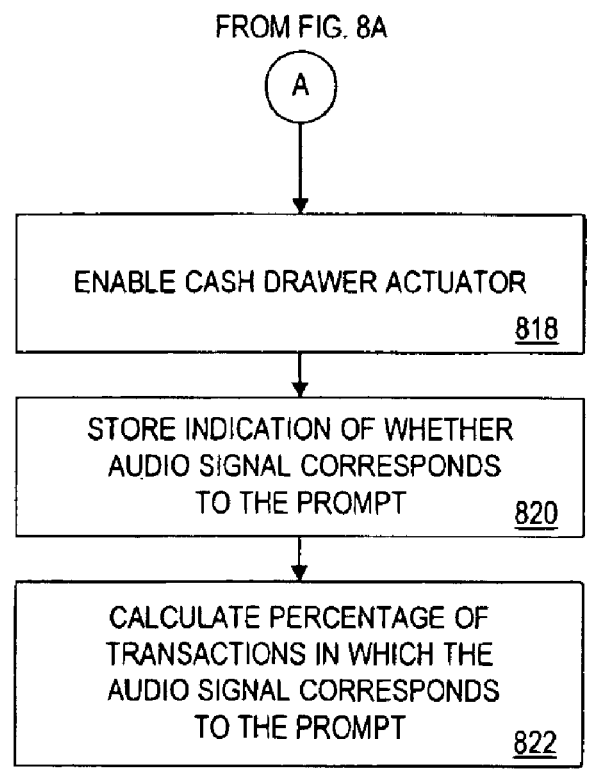

Referring to FIGS. 8A and 8B, a flow chart 800 illustrates a method for determining whether a verbal message was spoken during a transaction at the POS terminal 200 (FIG. 2). An operator identifier is received by the POS terminal (step 802). For example, an operator may enter his operator identifier via a keypad of the POS terminal 200. Alternatively, the operator may pass his identity card or a smart card through a card reader of the POS terminal 200. Such an identity card may include a magnetic strip encoding the operator identifier. The operator may also speak his name or other identifying information into a microphone of the POS terminal. The spoken information would be compared with voice files stored in the operator database 222 (FIG. 2) to identify the operator. Once the operator identifier is received, the identified operator is assumed to be the operator using the POS terminal 200 for subsequent transactions until he logs out (e.g. until a log out key on the keypad is actuated, the POS terminal 200 is shut off or another operator identifier is received).

Identification of the operator is advantageous because it allows operator performance to be monitored and, if need be, allows operator behavior to be corrected. Furthermore, the POS terminal 200 may be customized to the operator. For example, in an embodiment where the POS terminal 200 is trained to recognize the speech characteristics of each operator ("speaker dependent voice recognition"), identifying the operator allows the speech characteristics of that operator to be retrieved from storage (e.g. in the data storage device 204 or on the identity card) and used in recognizing speech. Operators may also receive bonuses based on their performance, as described below.

A transaction is then initiated at the POS terminal (step 804). A transaction may be initiated when a "new transaction" key is actuated or another predetermined input is received. Alternatively, a transaction may be considered initiated upon cessation of the previous transaction. Those skilled in the art will understand that still other criteria may be used for considering a transaction as having been initiated.

The POS terminal 200 then receives transaction data (step 806), such as items ordered by a customer and the quantity of each item. Transaction data may be received by actuation of keys of the input device 206, scanning of bar codes or voice input received from a microphone of the POS terminal. Still other ways of receiving transaction data will be understood by those skilled in the art.

The POS terminal 200 generates a prompt to be spoken (step 808). As described below, the prompt may be selected from a set of prompts based on various criteria. The prompt is transmitted or otherwise provided to the operator (step 810). The prompt may be displayed as text on the display device 210, or may be transmitted as audio signals to an earphone (e.g. one of the speakers 216 and 218) worn by the operator. At step 812, the POS terminal receives an audio signal (e.g. from one of the microphones 212 and 214). The audio signal may represent sound received during a predetermined time interval. Typically, the predetermined time interval starts at a predetermined time, such as when the prompt is transmitted, and may have a predetermined duration, such as five seconds. The audio signal may also represent sound received during a period of time that ends upon occurrence of a predetermined event, such as when a key is actuated, transaction data is received or a predetermined word or phrase has been recognized. Those skilled in the art will appreciate other methods for receiving audio signals that may represent a verbal message.

If the audio signal does not correspond to the prompt (step 814) (i.e. the audio signal does not indicate that the prompt was spoken), then the transaction is paused and the prompt is retransmitted to the operator (step 810). One method for pausing the transaction is to disable the cash drawer actuator 211 (FIG. 2) that opens the cash drawer of the POS terminal (step 816), thereby preventing the cash drawer from opening and preventing money from being withdrawn from or placed in the cash drawer. Those skilled in the art will understand that there are other methods of preventing the cash drawer from opening. Another method of pausing the transaction is preventing the calculation of the subtotal price of the items in the transaction. Yet another method of pausing the transaction is to ignore input from the operator and/or prevent the operator from entering input (e.g. disable keys on a keypad or do not display appropriate controls on a touch screen). Although in the description herein reference is made to enabling and disabling the cash drawer actuator 211 (FIG. 2), those skilled in the art will understand that there are other methods of pausing the transaction.

Those skilled in the art will understand that many different characteristics of the verbal message may be monitored and controlled, and further steps may be performed if the audio signal does not correspond to the prompt. For example, if the average amplitude of the audio signal (i.e. volume) is below a predetermined threshold, the POS terminal may transmit a command to the operator instructing him to speak louder. Similarly, if the average frequency (i.e. pitch) is not within a predetermined range, the POS terminal may transmit a command to the operator instructing him to alter his speech.

If the audio signal does correspond to the prompt (step 814) (e.g. the operator did not speak the expected phrase or did not speak at all), then the cash drawer actuator is enabled (step 818). An indication of whether the audio signal corresponds to the prompt is stored (step 820), for example, by increasing the value stored in the field 328 of the appropriate entry of the operator database 222 (FIG. 2). Furthermore, the percentage of transactions in which the audio signal corresponds to the prompt is calculated (step 822) and may be stored in the field 330 of the appropriate entry of the operator database 222 (FIG. 2). Such a percentage may be specific to those transactions involving the current operator, allowing an aspect of the operator's performance to be measured.

Figure 9:
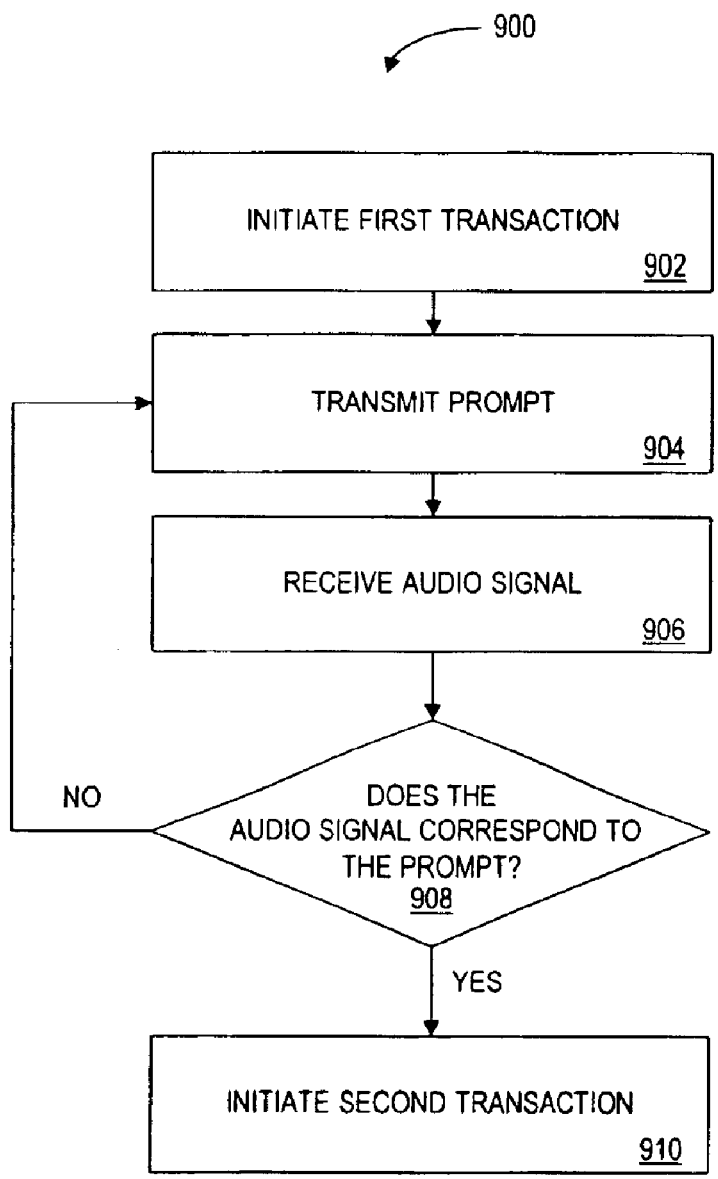
FIG. 9 is a flow chart illustrating another embodiment of a method for determining whether a verbal message was spoken during a transaction at a POS terminal.

Referring to FIG. 9, a flow chart 900 illustrates another embodiment of a method for determining whether a verbal message was spoken during a transaction at the POS terminal 200 (FIG. 2). In the method illustrated by FIG. 9, the POS terminal 200 prevents initiation of a new transaction until it is determined that the audio signal corresponds to the prompt. A first transaction is initiated (step 902) and a prompt to be spoken is transmitted (step 904). An audio signal is received (step 906) and compared with the prompt to determine whether the audio signal corresponds to the prompt (step 908). If the audio signal does not correspond to the prompt, the prompt is again transmitted (step 904). If the audio signal does correspond to the prompt, then a second transaction may be initiated (step 910).

Figure 10A:
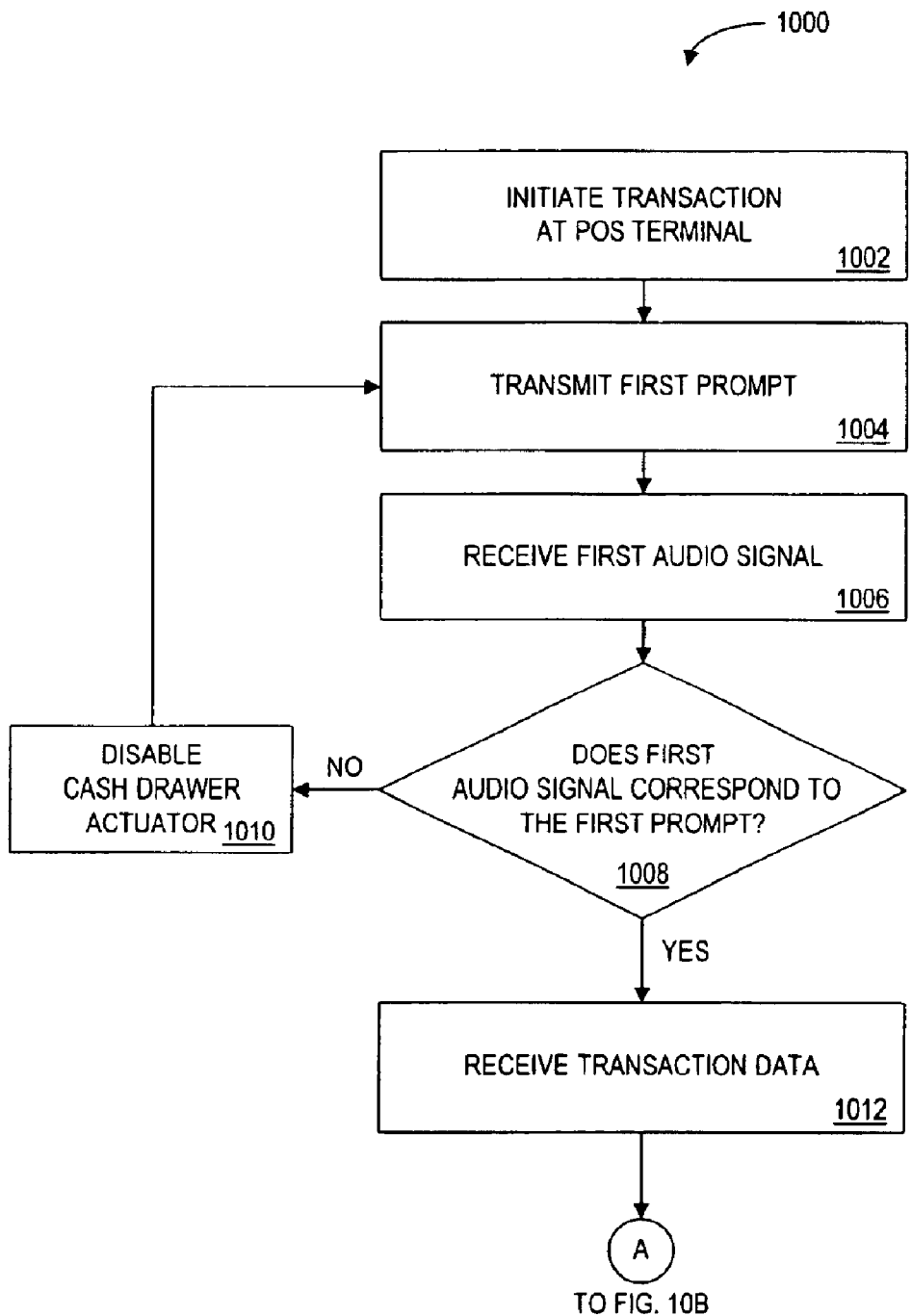
FIGS. 10A and 10B are a flow chart illustrating another embodiment of a method for determining whether a verbal message was spoken during a transaction at a POS terminal.
Figure 10B:
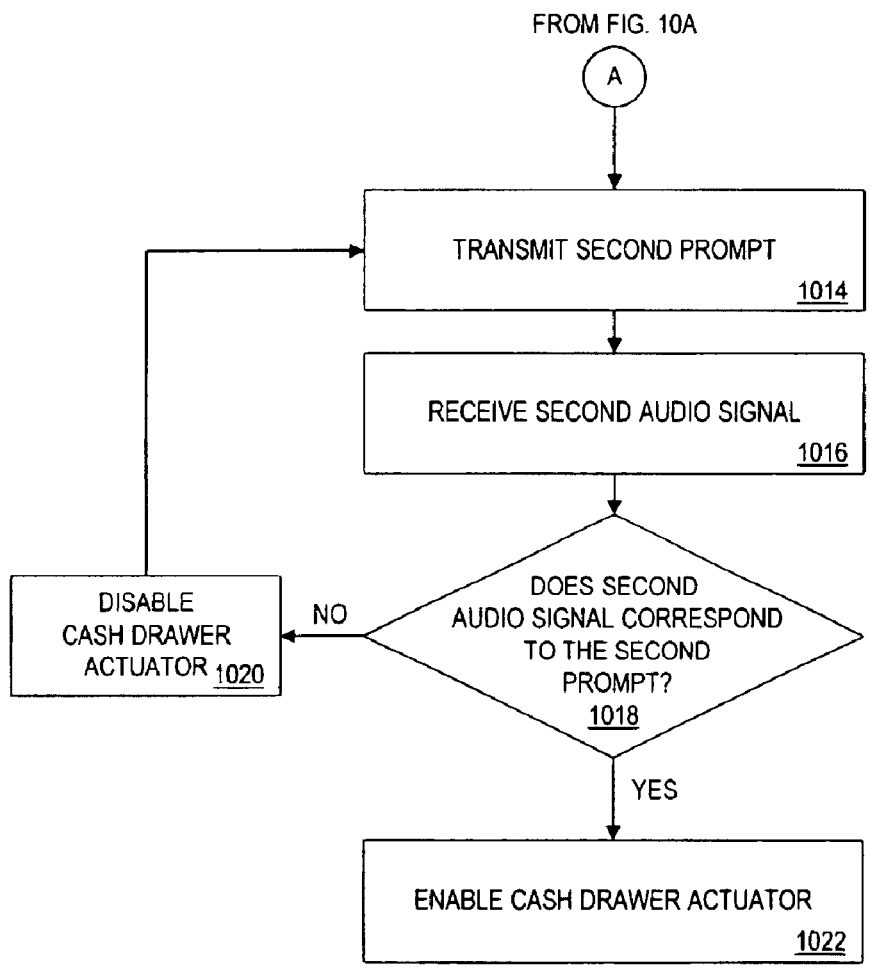

Referring to FIGS. 10A and 10B, a flow chart 1000 illustrates another embodiment of a method for determining whether a verbal message was spoken during a transaction at the POS terminal 200 (FIG. 2). In the exemplary method illustrated by FIGS. 10A and 10B, more than one prompt must be spoken by an operator. The two prompts may be different, and are provided and the corresponding verbal messages are expected at different stages of the transaction.

A transaction is initiated at the POS terminal 200 (step 1002) and a first prompt to be spoken is transmitted (step 1004). A first audio signal is received (step 1006) and compared with the first prompt to determine whether the first audio signal corresponds to the first prompt (step 1008). If the first audio signal does not correspond to the first prompt, the actuator of the cash drawer of the POS terminal is disabled (step 1010), and the first prompt is again transmitted (step 1004).

If the first audio signal does correspond to the first prompt, then the POS terminal receives transaction data (step 1012) and a second prompt is transmitted (step 1014). A second audio signal is received (step 1016) and compared with the second prompt to determine whether the second audio signal corresponds to the second prompt (step 1018). If the second audio signal does not correspond to the second prompt, the actuator of the cash drawer of the POS terminal is disabled (step 1020), and the second prompt is again transmitted (step 1014). If the second audio signal does correspond to the second prompt, then the actuator of the cash drawer of the POS terminal is enabled (step 1022).

Figure 11A:
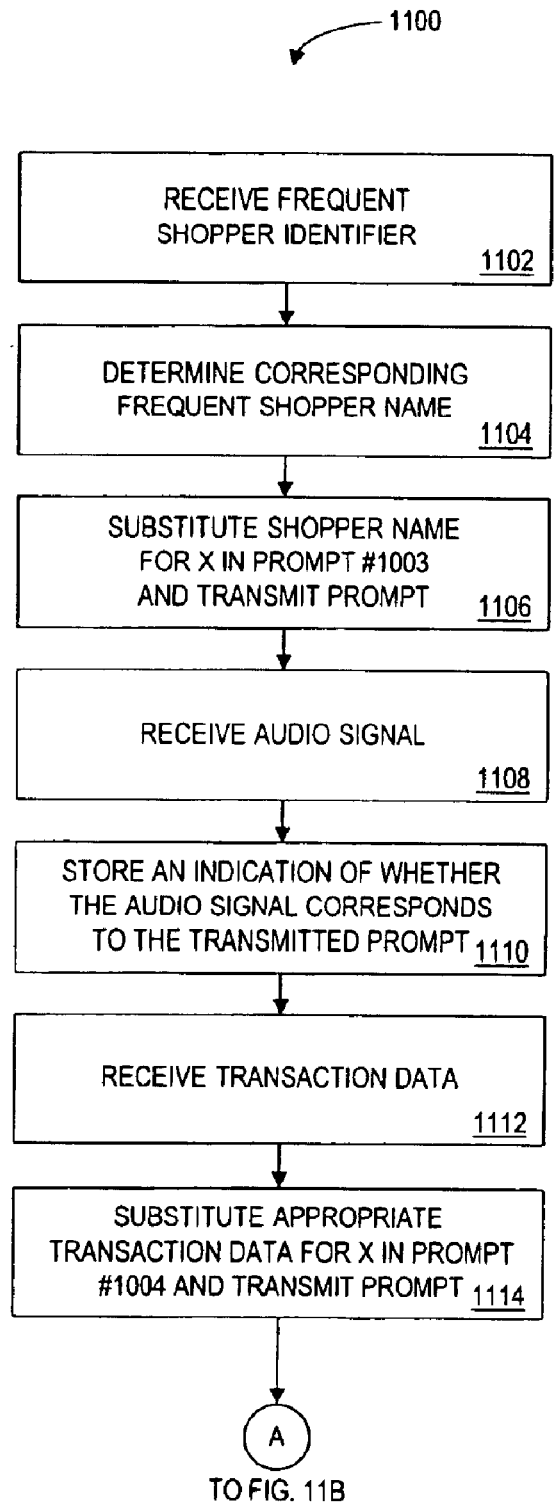
FIGS. 11A and 11B are a flow chart illustrating another embodiment of a method for determining whether a verbal message was spoken during a transaction at a POS terminal.
Figure 11B:
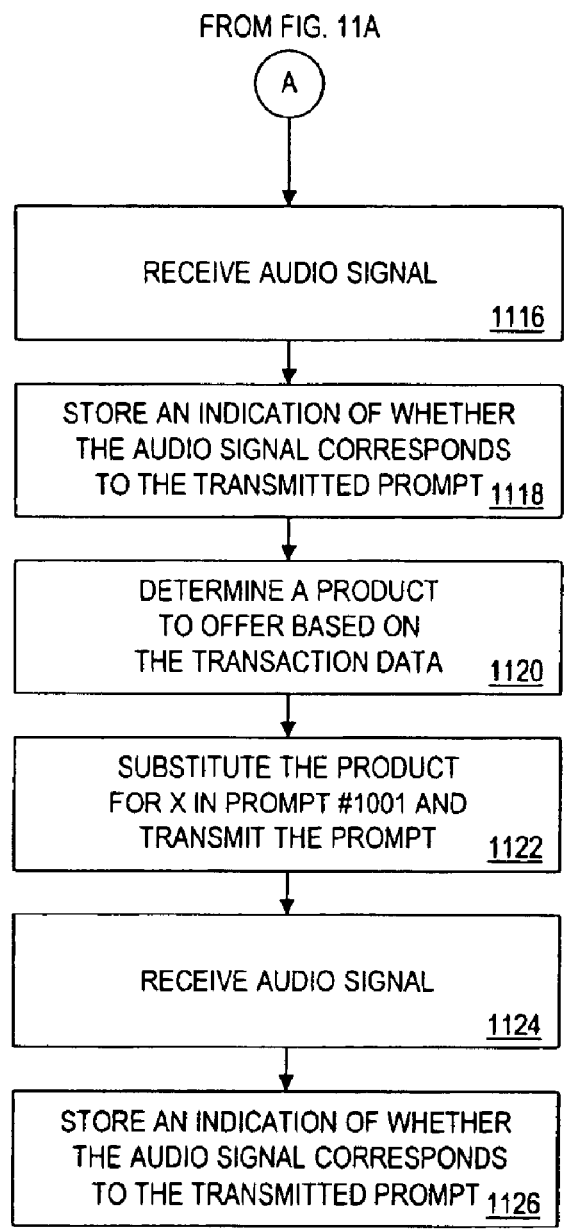

Referring to FIGS. 11A and 11B, a flow chart 1100 illustrates another embodiment of a method for determining whether a verbal message was spoken during a transaction at the POS terminal 200 (FIG. 2). In the method illustrated by FIGS. 11A and 11B, more than one exemplary prompt is to be spoken by an operator.

A frequent shopper identifier is received by the POS terminal (step 1102). For example, a frequent shopper identifier may be entered via a keypad of the POS terminal 200. Alternatively, a frequent shopper identifier may be entered by passing a frequent shopper card through a card reader of the POS terminal 200. Such a frequent shopper card would include a magnetic strip encoding the frequent shopper identifier. A frequent shopper identifier or other frequent shopper information may also be read from a smart card of the customer. Such a smart card would typically include a semiconductor memory storing the frequent shopper identifier. Alternatively, the POS terminal may include a biometric sensor for reading biometric input (e.g. fingerprints, voice prints or retinal scan) from the customer. Such biometric input would uniquely identify the customer.

The POS terminal 200 then determines a corresponding frequent shopper name (step 1104). For example, the POS terminal 200 may search the frequent shopper database 230 (FIG. 2) to find a frequent shopper name that corresponds to the frequent shopper identifier. In another embodiment, the frequent shopper name may be received concurrently with, or instead of, the frequent shopper identifier (e.g. via a frequent shopper card or smart card).

The frequent shopper name is used to customize a predetermined prompt in the prompt database 228. Specifically, the prompt identified by "1003" (the entry 606) includes corresponding prompt text "Hello, [X]." Substituting the frequent shopper name for X results in a prompt that is customized to the frequent shopper. The customized prompt is transmitted (step 1106) to the operator, who must then speak the customized prompt. The frequent shopper may thus be greeted by name.

The POS terminal receives an audio signal (step 1108) from the operator and stores an indication of whether the audio signal corresponds to the prompt (step 1110). Thus, if the operator does not properly speak the customized prompt (e.g. he says nothing or does not say the customer's name), the transaction need not be paused but the operator's recorded performance may be affected (e.g. by adjustment of the appropriate entry of the operator database 222).

Transaction data is then received (step 1112), and appropriate transaction data is substituted for X in the prompt identified by "1004" (the entry 608), which has corresponding prompt text "Your order is [X]". The customized prompt is transmitted to the operator (step 1114), who must then speak the customized prompt. The frequent shopper may thus hear the operator repeat his order, to ensure that the order has been heard correctly and accurately registered.

The POS terminal receives an audio signal (step 1116) from the operator and stores an indication of whether the audio signal corresponds to the (second) prompt (step 1118). As described above, the operator's recorded performance may be affected accordingly (e.g. by adjustment of the appropriate entry of the operator database 222).

Based on the transaction data, the POS terminal determines an appropriate product to offer the customer (step 1120). For example, if the order does not include a particular type of item, that type of item could be offered to the customer. The name of the product is substituted for X in the prompt identified by "1001" (the entry 602), which has corresponding prompt text "Would you like [X] with your order?" The customized prompt is transmitted to the operator (step 1122), who must then speak the customized prompt. The POS terminal in turn receives an audio signal (step 1124) from the operator and stores an indication of whether the audio signal corresponds to the (third) prompt (step 1126). As described above, the operator's recorded performance may be affected accordingly (e.g. by adjustment of the appropriate entry of the operator database 222).

The above described steps 1110, 1118 and 1126 of storing may comprise storing the respective audio signals which are subsequently analyzed to determine whether they correspond to the corresponding prompts. For example, the POS terminal 200 or the server 12 (FIG. 1) may process the stored audio signals at the end of each day to generate operator performance measurements.

Figure 12A:
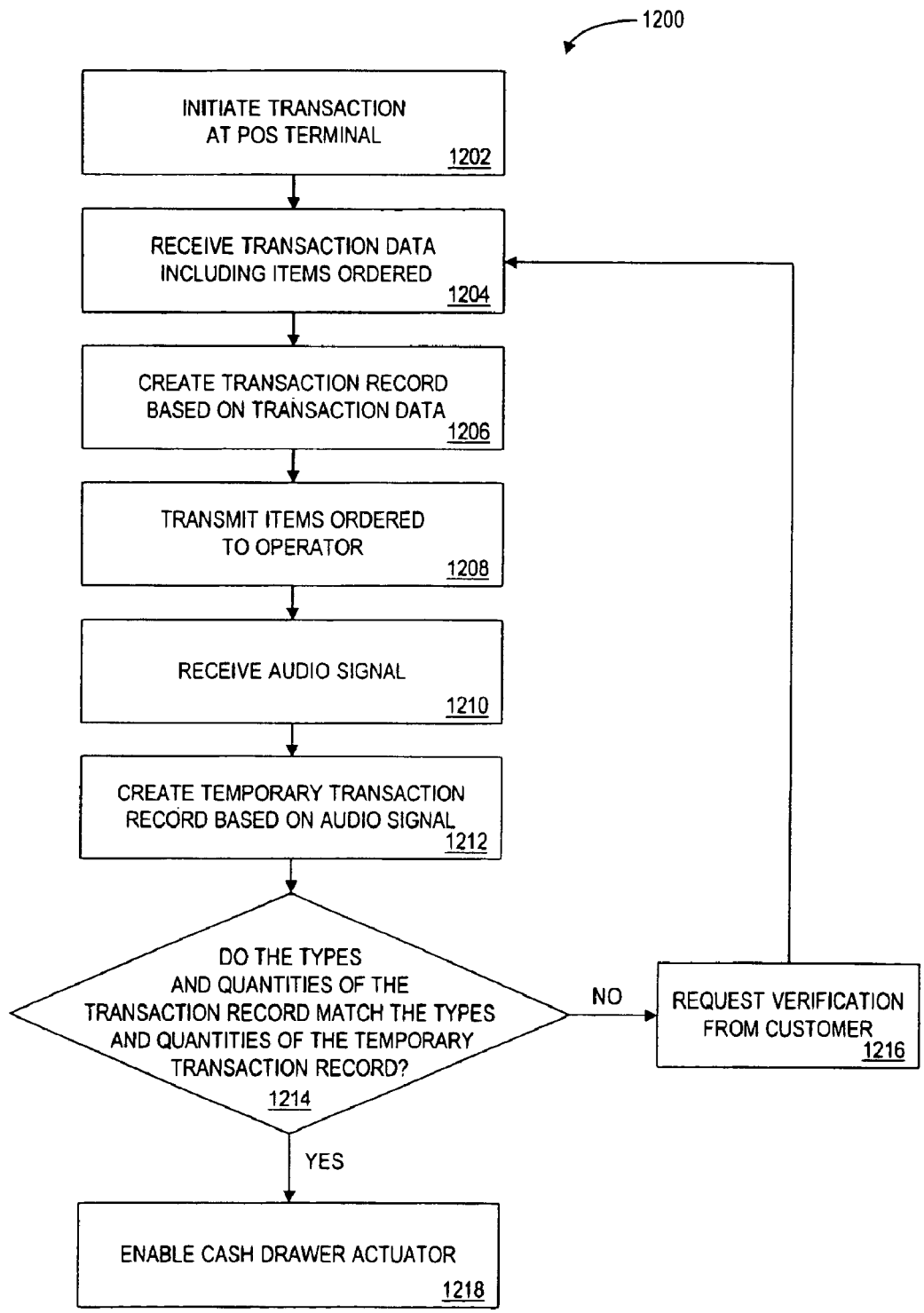
FIG. 12A is a flow chart illustrating another embodiment of a method for determining whether a verbal message was spoken during a transaction at a POS terminal.

Referring to FIG. 12A, a flow chart 1200 illustrates another embodiment of a method for determining whether a verbal message was spoken during a transaction at the POS terminal 200 (FIG. 2). In the method illustrated by FIG. 12A, the operator speaks the items ordered by the customer. The transaction is paused until this verbal message of the operator corresponds to the order (e.g. the types and quantities of items to purchase) as it is recorded by the POS terminal 200.

The transaction at the POS terminal 200 is initiated (step 1202) and transaction data, including the items ordered, is received (step 1204) (e.g. via key actuation or voice input). Based on the received transaction data, the POS terminal 200 creates a transaction record (step 1206), such as the record 500 of FIG. 5, that stores the types and quantities of items ordered. The types and quantities are transmitted to the operator (step 1208), and may be displayed as text on the display device 210 or may be transmitted as audio signals to an earphone (e.g. one of the speakers 216 and 218) worn by the operator.

The POS terminal 200 receives an audio signal from the operator (step 1210) which is expected to be the operator speaking the order back to the customer. The POS terminal 200 uses speech recognition techniques to determine what words were spoken and in turn creates a temporary transaction record based on the audio signal (step 1212). The temporary transaction record has the same format as the transaction record created in step 1206. The transaction record and the temporary transaction record are compared to determine whether the types and quantities of items ordered included in the transaction record (the order recorded by the POS terminal 200) match the types and quantities of items ordered included in the temporary transaction record (the order spoken by the operator) (step 1214).

If the two do not match, then the operator requests verification from the customer (step 1216) that the order recorded by the POS terminal 200 is correct. For example, the operator may receive a prompt (e.g. on the display device 210 or via an earphone) instructing him to ask the customer to repeat his order. Alternatively, requesting verification may include outputting an audio message via a speaker to the customer requesting that he repeat his order. In another embodiment, the operator receives a prompt that includes the differences between the temporary transaction record and the transaction record. For example, where the temporary transaction record and the transaction record differ only by the quantity of hamburgers in the customer's order, the prompt may be "I'm sorry, did you order two or three hamburgers?"

In another embodiment, the requesting verification may include instructing the operator to repeat the order, then instructing the operator to ask the customer if the repeated order is correct. If the customer indicates that the repeated order is incorrect, the POS terminal 200 transmits a prompt instructing the operator to take the customer's order again.

If the temporary transaction record and the transaction record match, then the cash drawer actuator is enabled, allowing the transaction to proceed. In such an embodiment, it may be assumed that the cash drawer is disabled (i.e. cannot be opened) until the cash drawer actuator is enabled as during the step 1218.

Figure 12B:
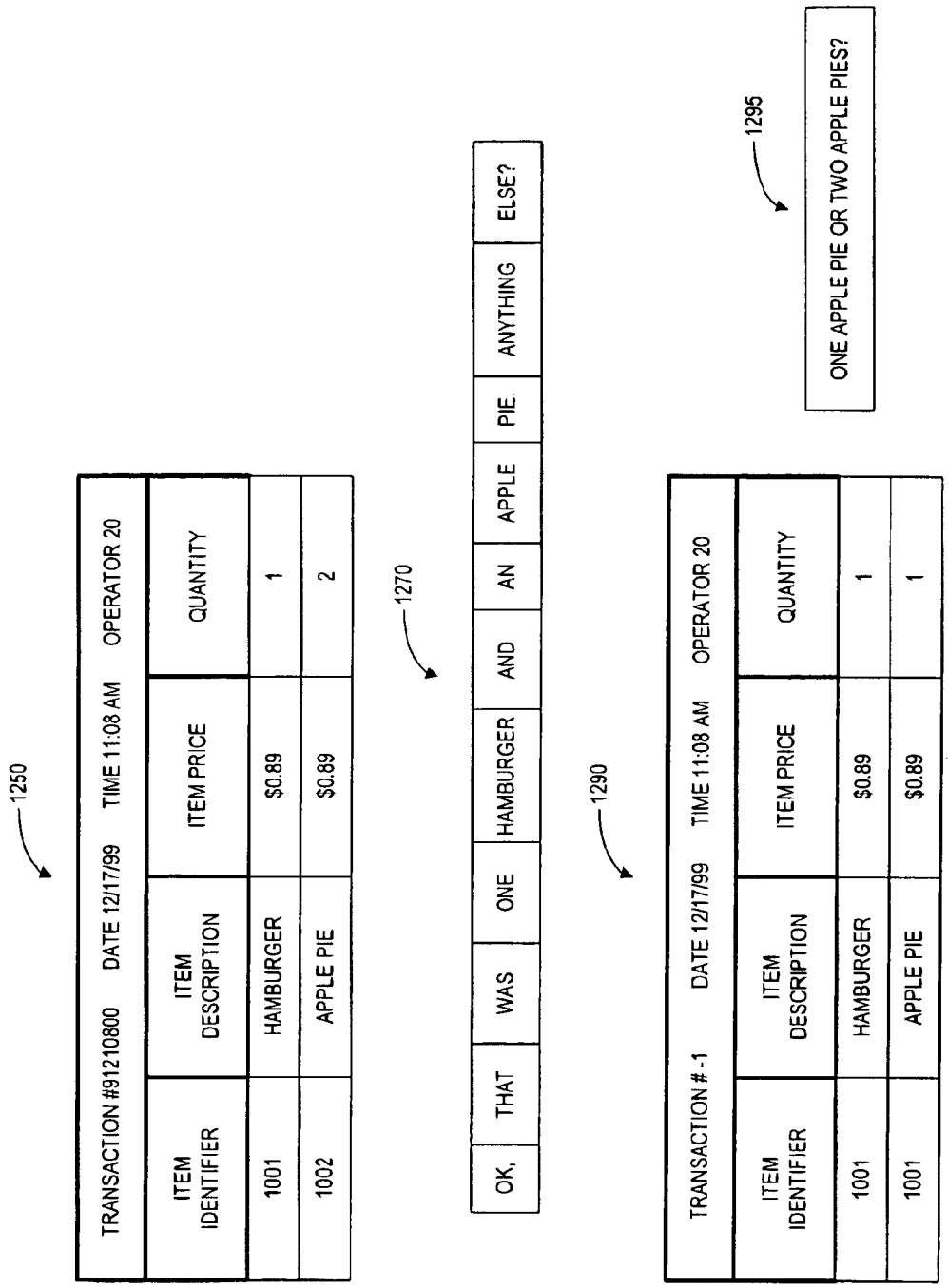
FIG. 12B is a schematic illustration showing exemplary data that illustrates the method of FIG. 12A.

Referring to FIG. 12B, exemplary data is shown to illustrate the method shown in FIG. 12A. A transaction record 1250 that is created based on transaction data. An audio signal 1270 which should be the operator speaking the order back to the customer is received from the operator. A temporary transaction record 1290 is created from the audio signal 1270. Since in the example illustrated by FIG. 12B the transaction record 1250 differs from the temporary transaction record 1290, the POS terminal creates a prompt 1295 that includes the differences between the temporary transaction record and the transaction record.

Figure 13:
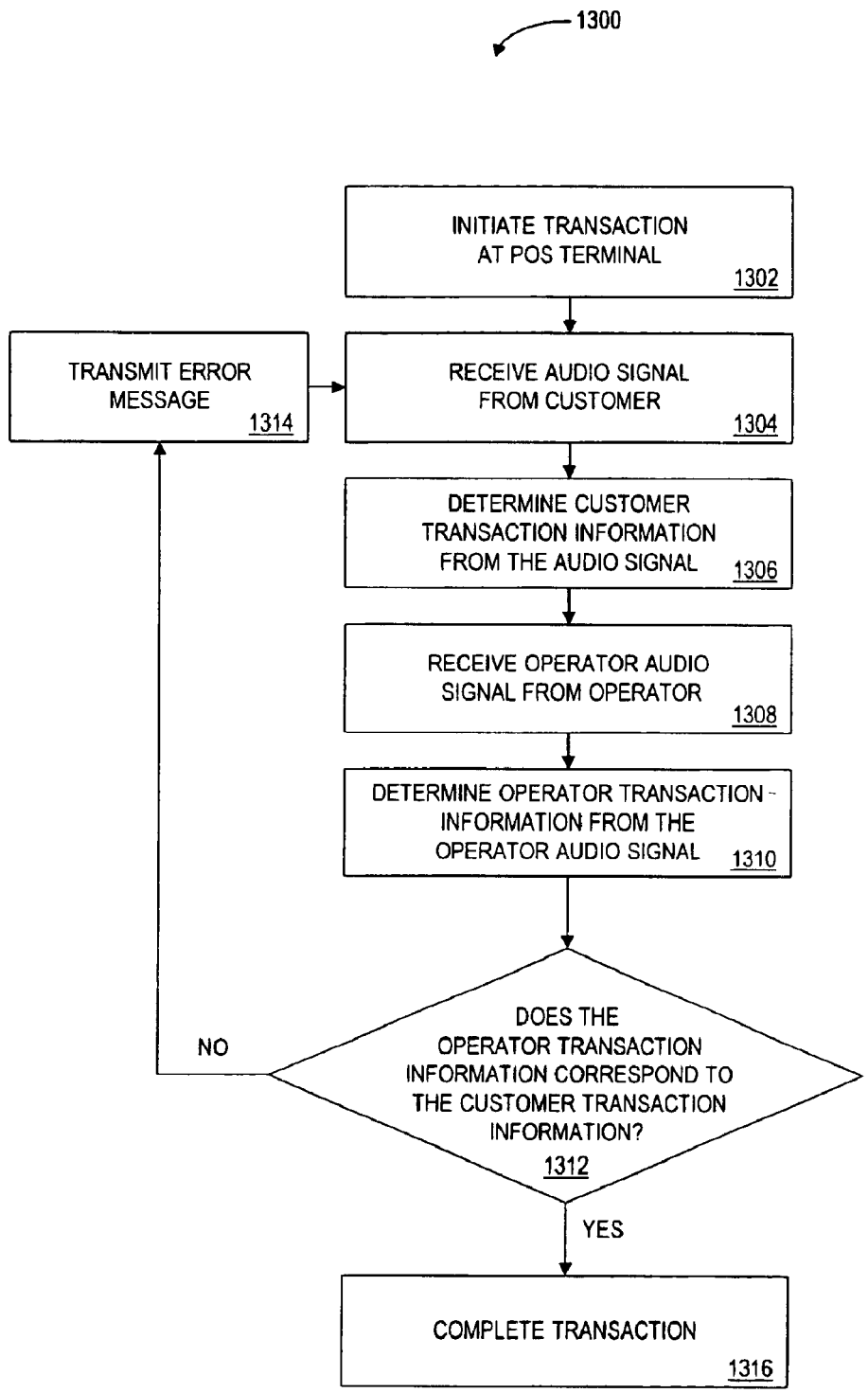
FIG. 13 is a flow chart illustrating another embodiment of a method for determining whether a verbal message was spoken during a transaction at a POS terminal.

Referring to FIG. 13, a flow chart 1300 illustrates another embodiment of a method for determining whether a verbal message was spoken during a transaction at the POS terminal 200 (FIG. 2). In the method illustrated by FIG. 13, the customer speaks his order and the operator repeats the order. The transaction is paused until both spoken orders match.

The transaction at the POS terminal 200 is initiated (step 1302) and an audio signal is received from the customer (step 1304). The POS terminal 200 uses speech recognition techniques to determine what words were spoken by the customer, and in turn determines customer transaction information from the audio signal (step 1306). The customer transaction information may be, for example, the types and quantities of items spoken by the customer.

An operator audio signal is then received from the operator (step 1308). The POS terminal 200 uses speech recognition techniques to determine what words were spoken by the operator, and in turn determines operator transaction information from the operator audio signal (step 1310). The operator transaction information may be, for example, the types and quantities of items spoken by the operator.

If the operator transaction information does not correspond to the customer transaction information (step 1312), then an error message is transmitted (step 1314). For example, the operator may receive a prompt (e.g. on the display device 210 or via an earphone) instructing him to ask the customer to repeat his order. Alternatively, an audio message may be transmitted via a speaker to the customer requesting that he repeat his order. In another embodiment, the operator receives a prompt that includes the differences between the operator transaction information and the customer transaction information. For example, where the operator transaction information and the customer transaction information differ only by the quantity of hamburgers in the customer's order, the prompt may be "I'm sorry, did you order two or three hamburgers?" If the operator transaction information does correspond to the customer transaction information, then the transaction is completed (step 1316).

In another embodiment, the customer may simply be asked whether the repeated order is correct, and the customer's response (e.g. "yes" or "no") is recorded and processed by the POS terminal 200. If the customer's response indicates that the order is incorrect, the operator receives a prompt instructing him to re-enter the order.

Figure 14A:
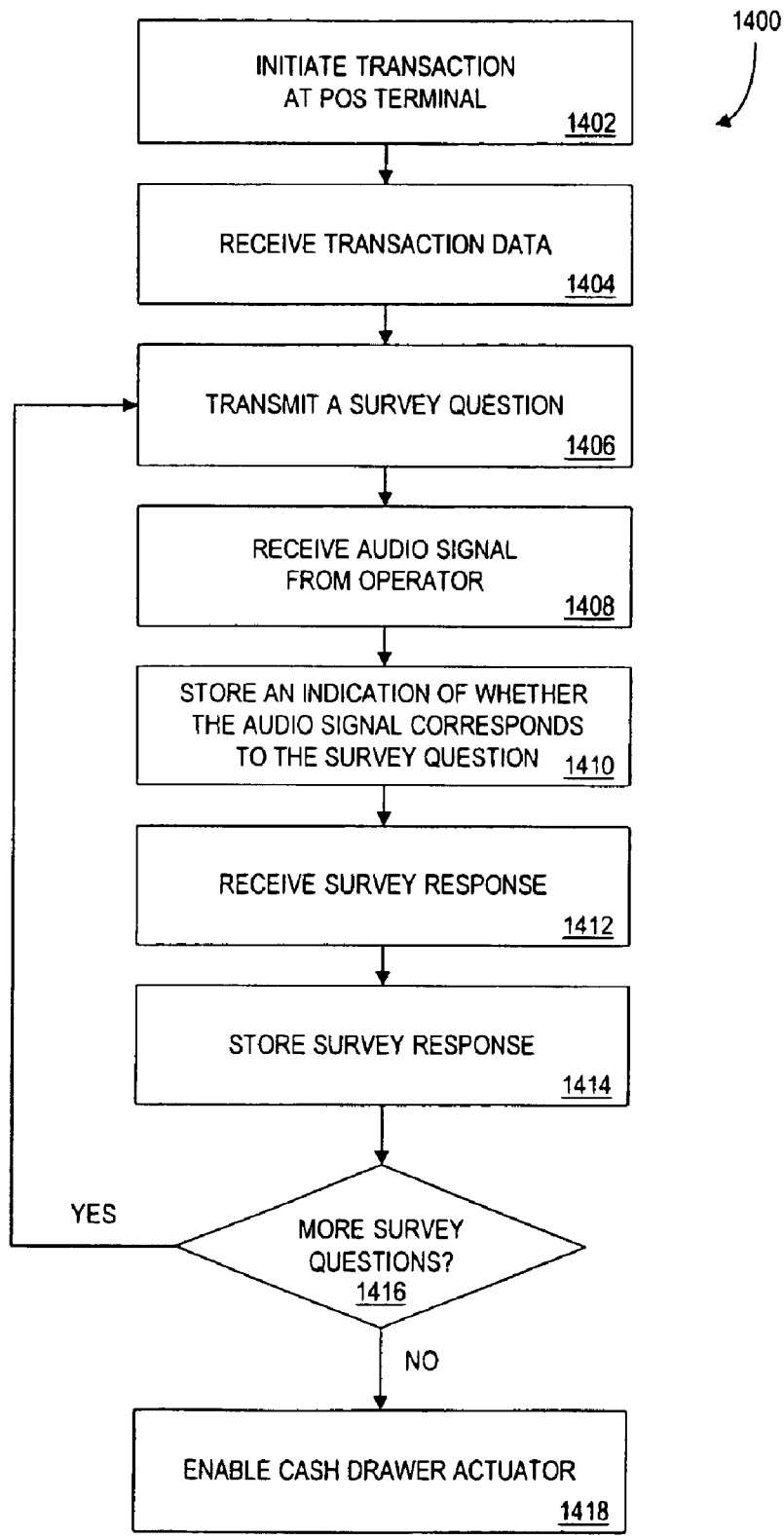
FIG. 14A is a flow chart illustrating another embodiment of a method for determining whether a verbal message was spoken during a transaction at a POS terminal.

Referring to FIG. 14A, a flow chart 1400 illustrates another embodiment of a method for determining whether a verbal message was spoken during a transaction at the POS terminal 200 (FIG. 2). In the method illustrated by FIG. 14, the customer is provided with survey questions to answer. The transaction is paused until all survey questions have received responses.

A transaction is initiated (step 1402) at the POS terminal, and transaction data is received (step 1404). A survey question is transmitted to the operator (step 1406). The survey question may be displayed as text on the display device 210, or may be transmitted as audio signals to an earphone (e.g. one of the speakers 216 and 218) worn by the operator. At step 1408, the POS terminal receives an audio signal from the operator (e.g. via one of the microphones 212 and 214), which should be the operator speaking the survey question. An indication of whether the audio signal corresponds to the survey question is stored (step 1410), for example, by increasing the value stored in the field 328 of the appropriate entry of the operator database 222 (FIG. 2).

The POS terminal then receives a survey response from the customer (step 1412). The survey response may be entered by the customer via a keypad on the POS terminal. Alternatively, the customer may speak his response, or the operator may repeat the customer's response, into one of the microphones 212 and 214. The survey response is stored (step 1414) for future analysis. If there are more survey questions to be answered by the customer (step 1416), those survey questions are likewise transmitted to the operator (step 1406). If there are not any more survey questions to be answered, then the cash drawer actuator is enabled (step 1418) to allow the cash drawer to open.

Referring to FIG. 14B, a survey database 1430, which may be stored in the data storage device 204 (FIG. 2), may be used to store both survey questions and responses to those survey questions in one embodiment of the present invention. The survey database 1430 includes entries 1432 and 1434, each of which describes a survey question and responses thereto.

It will be understood by those skilled in the art that the survey database 1430 may include any number of entries. The survey database 1430 also defines fields for each of the entries 1432 and 1434 that specify (i) a survey question identifier 1436 for uniquely identifying the survey question, (ii) survey question text 1438, (iii) a number of responses 1440 that were "A" (the first choice), (iv) a number of responses 1442 that were "B" (the second choice), and (v) a number of responses 1444 that were "C" (the third choice). In another embodiment, the response may be provided in audio form, recorded and stored in the survey database 1430.

In an embodiment which uses the survey database 1430, survey questions are retrieved from the survey database 1430, typically sequentially, and survey response are stored by adjusting the corresponding values of fields 1440, 1442 and 1444 as appropriate.

Figure 14C:
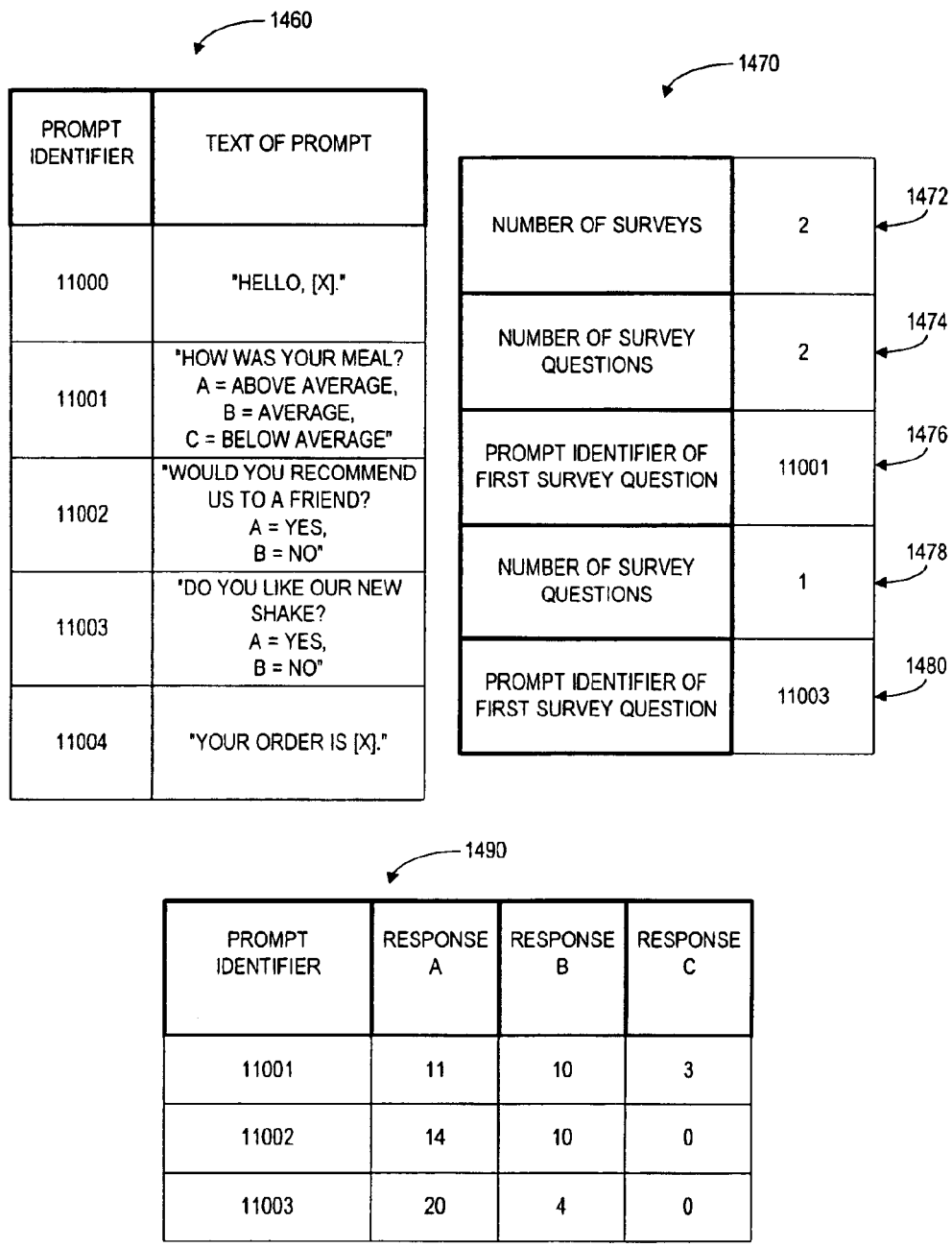
FIG. 14C is a schematic illustration of databases used in storing survey questions and survey responses.

Referring to FIG. 14C, a table 1460 represents the prompt database 228 (FIG. 2) which may store prompts that are survey questions as well as prompts that are not survey questions. A table 1470, which may be stored in the data storage device 204 (FIG. 2), stores data that identifies survey questions in the table 1460. An entry 1472 indicates how many surveys are stored in the table 1460. For example, there may be a plurality of surveys, one of which is randomly selected during a customer transaction. The exemplary data shown in FIG. 14C indicates that there are two surveys stored in the table 1460. Entries 1474 and 1476 pertain to the first survey, while entries 1478 and 1480 pertain to the second survey. The entries 1474 and 1478 indicate how many questions are included in the first and second surveys respectively. The entries 1476 and 1480 indicate the prompt identifier of the first survey question of the first and second surveys respectively. A table 1490, which may be stored in the data storage device 204 (FIG. 2), stores survey responses.

Those skilled in the art will understand that the survey questions may be updated periodically to enable the POS terminal to gather different information as necessary. In addition, new survey questions may be received by the server 12 (FIG. 1) from remote computing devices (e.g. from company headquarters). These new survey questions may in turn be transmitted to the POS terminals 14, 16 and 18 that are in communication with the server 12.

Figure 15:
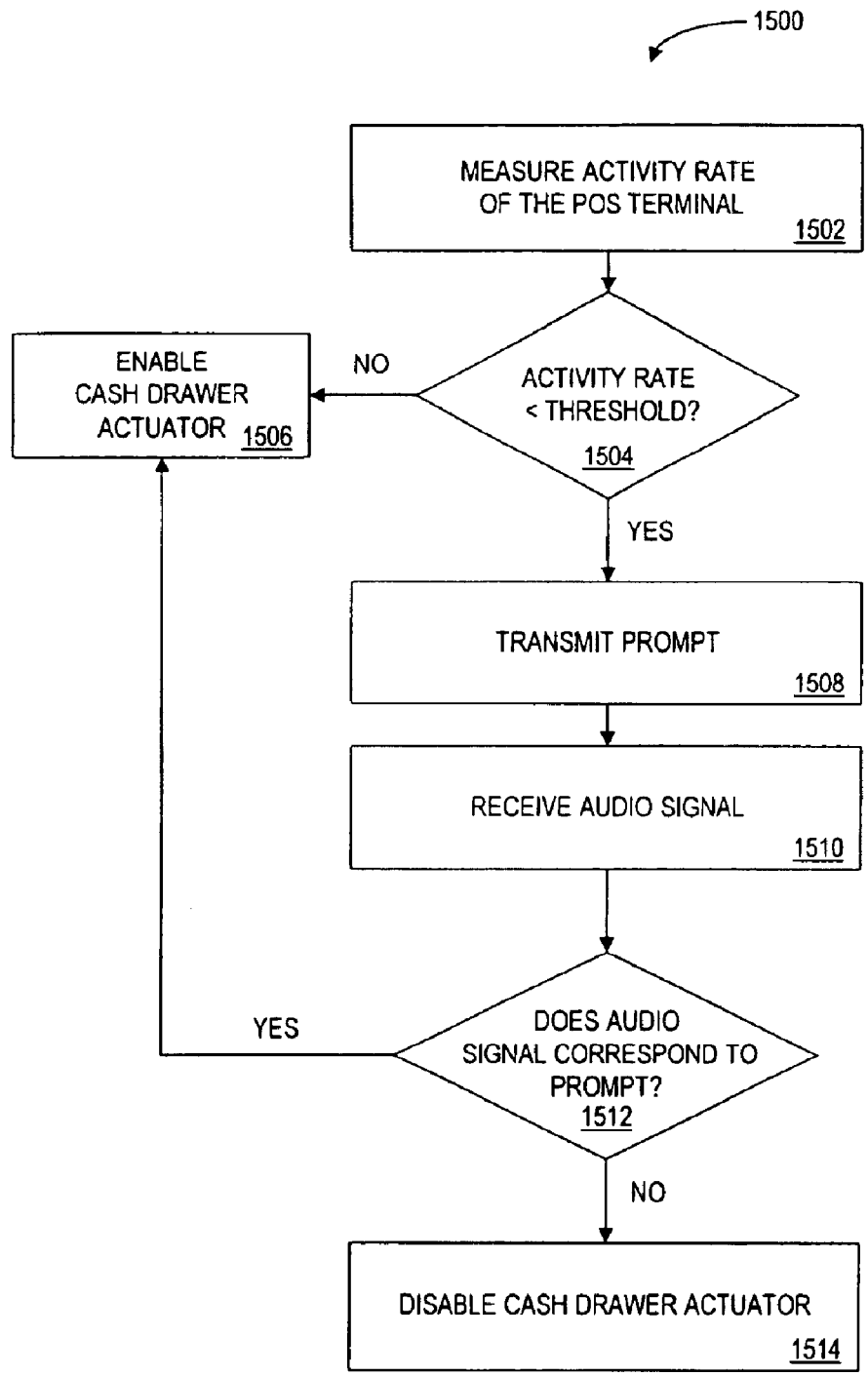
FIG. 15 is a flow chart illustrating another embodiment of a method for determining whether a verbal message was spoken during a transaction at a POS terminal.

Referring to FIG. 15, a flow chart 1500 illustrates another embodiment of a method for determining whether a verbal message was spoken during a transaction at the POS terminal 200 (FIG. 2). In the method illustrated by FIG. 15, the transaction may not be paused unless the activity rate of the POS terminal is sufficiently low. For example, if there are many customers waiting in line, it is disadvantageous to pause transactions since that would increase the waiting time of those customers.

The activity rate of the POS terminal 200 is measured (step 1502). For example, the POS terminal 200 may measure the number of completed transactions per period of time (transaction rate), the number of items purchased through the POS terminal 200 per period of time (item sale rate), profitability per period of time, profitability per transaction, average transaction duration or the number of offers accepted by customers per period of time (acceptance rate). The POS terminal 200 may also measure the number of customers, such as the number of customers in a store or the number of customers in the vicinity of the POS terminal 200, through input signals received from a sensor (not shown) in communication with the processor 202. Many other types of measurements may be made by the POS terminal 200.

The POS terminal determines whether the activity rate is below a predetermined threshold (step 1504). For example, it may be determined whether there are less than three transactions completed per minute. If the activity rate is not below a predetermined threshold (i.e. there is sufficiently high activity rate), then the cash drawer actuator is enabled (step 1506) since it would be disadvantageous to further lower the activity rate by pausing the transaction.

However, if the activity rate is below a predetermined threshold (i.e. there is a low activity rate), then an appropriate prompt is transmitted (step 1508) and an audio signal is received (step 1510). If the audio signal corresponds to the prompt (step 1512), the cash drawer actuator is enabled (step 1506). However, if the audio signal does not correspond to the prompt, then the cash drawer actuator is disabled (step 1514) and the prompt is retransmitted (step 1508).

Thus, if the cashier does not properly provide the verbal message, the transaction is paused only if the activity rate of the POS terminal 200 is low (i.e. below the predetermined threshold). It will be understood by those skilled in the art that the predetermined threshold may be adjusted based on several factors, such as the time of day and historical sales rates during certain times of day or days of the week. In addition, pausing the transaction may be prevented manually. For example, a store manager may enter an appropriate command via the server 12 (FIG. 1) to prevent all POS terminals from pausing transactions.

As described above, the method and apparatus of the present invention may be used to provide offers to customer. One type of offering system is described in commonly-owned, co-pending patent application Ser. No. 08/920,116 entitled METHOD AND SYSTEM FOR PROCESSING SUPPLEMENTARY PRODUCT SALES AT A POINT-OF-SALE TERMINAL, filed on Aug. 26, 1997, which issued as U.S. Pat. No. 6,119,099 on Sep. 12, 2000. As described therein, a customer at a POS terminal may be offered an "upsell" in exchange for an amount of change he is due. The POS terminal determines an upsell in dependence on a purchase of the customer and also determines an upsell price (the amount of change due) based on the purchase. For example, a customer purchasing a first product for $1.74 and tendering $2.00 may be offered a second product in lieu of the $0.26 change due. The upsell price, $0.26, thus depends on the purchase price of $1.74.

Figure 16:
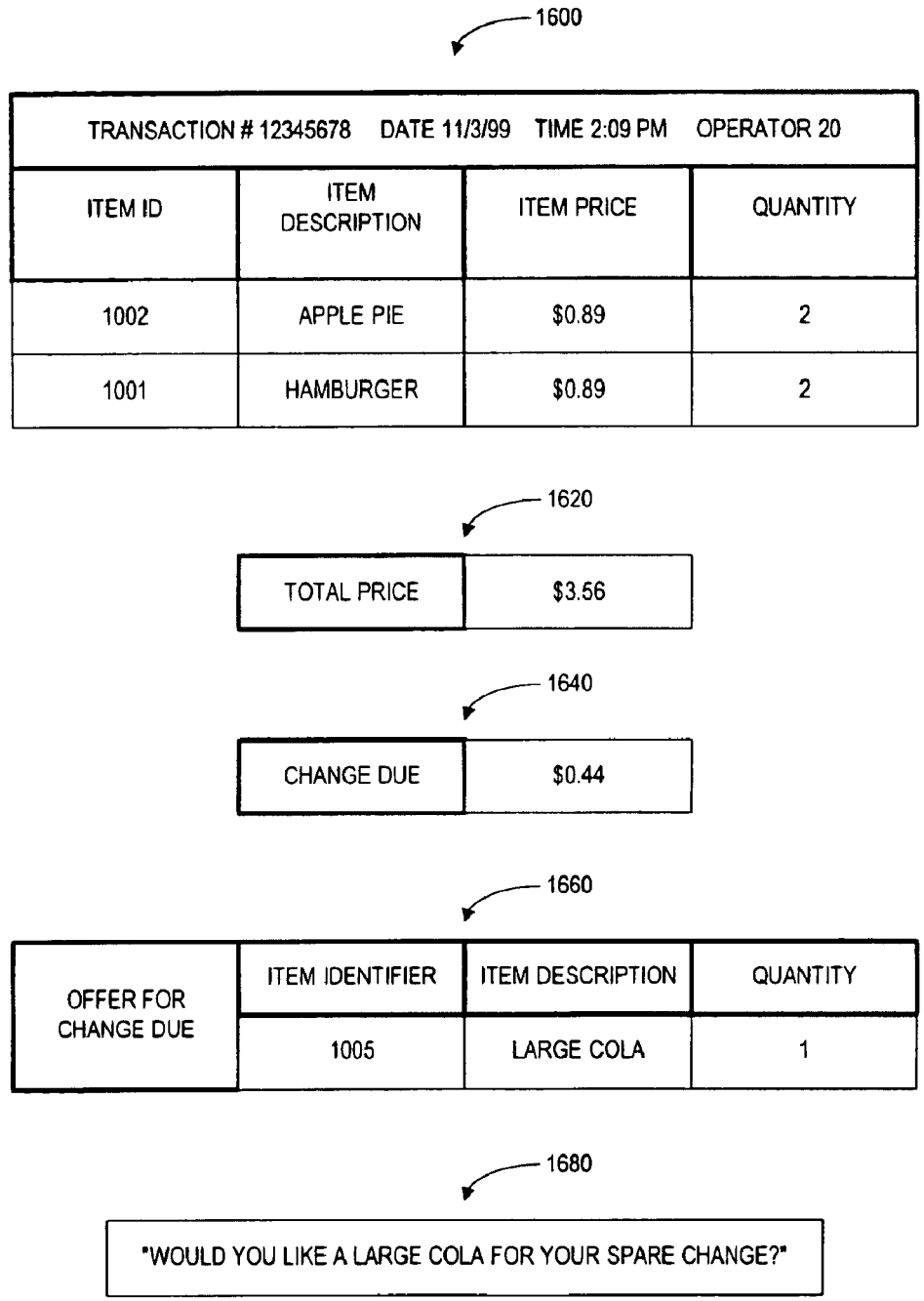
FIG. 16 is a schematic illustration of a transaction record generated by a POS terminal.

Referring to FIG. 16, a table 1600 represents a transaction record generated by a POS terminal. The POS terminal calculates the total price 1620 for the illustrated transaction and the amount of change due 1640 for the transaction (assuming $4.00 tendered by the customer). The POS terminal then generates an offer 1660 for the change due, typically based on which items that have a cost less than the amount of change due. Based on the offer 1660, the POS terminal generates a prompt 1680. The prompt 1680 is generated by substituting "large cola" for X in the prompt identified by prompt identifier "1002" (i.e. the prompt having prompt text "would you like a [X] for your spare change").

The type of offer may further depend on the frequent shopper status of the customer. For example, a customer with a frequent shopper status of "Platinum" may be provided with offers for their spare change, while other customers are not.

It may be desirable to allow the pausing of transactions to be overridden temporarily in certain situations. For example, if it would inconvenience the customer to pause the transaction or continue answering survey questions, an appropriately authorized operator or manager may be able to direct the POS terminal to instead complete processing the customer's order. In addition, if the present invention is applied to a "drive-through", there may be a sensor in communication with the processor 202 that determines whether the customer's car is still situated near the speaker and microphone of the car lane. If not, then the customer cannot hear the operator, so there is no need to continue providing a prompt instructing the operator to speak to the customer.

The present invention may be used in a variety of applications. For example, in a quick service restaurant environment, the present invention may be used to determine whether cashiers are properly greeting customers and providing customers with suggestive sell offers.

In a hotel environment, the present invention may be used to assure that customers are always provided with an offer to call a cab.

In a drug store environment, the present invention may be used to assure that cashiers offer customers filling a prescription a choice of a generic drug or a corresponding name brand drug. The present invention may also be used to assure that cashiers read drug warnings or other medical information to customers.

In a telemarketing environment, the present invention may be used to assure that operators speak the proper phrases to customers by preventing touch screen controls from appearing (and thus the transaction from proceeding) until the proper phrases are spoken.

In a medical environment, the present invention may be used to record the medication that a nurse or doctor administered to a patient (e.g. "I'm providing three tranquilizers to patient X").

In a retail environment, the present invention may be used to assure that operators ask a customer for age verification before selling alcohol or tobacco. The present invention may also be employed to inquire as to whether items that the customers desired were found. The customers' responses (e.g. "yes" or "no, I was looking for saline solution.") may be stored. The items that the customers desired are recorded and a list of such items could be printed out periodically for review by store management, and used in ordering inventory.

Although the present invention has been described with respect to a preferred embodiment thereof, those skilled in the art will note that various substitutions may be made to those embodiments described herein without departing from the spirit and scope of the present invention. For example, the above-described POS terminal may be used to monitor whether predetermined words and phrases, such as obscenities, are spoken by the operator.

What is claimed is:

1. A method, comprising:

outputting, to an operator of a point-of-sale terminal, a prompt instructing the operator to utter, during a transaction, a message to a customer participating in the transaction;

receiving, after the step of outputting, an audio signal, wherein the audio signal represents an utterance by the operator;

determining whether the utterance corresponds to the prompt;

determining an activity rate of the point-of-sale terminal; and pausing the transaction if the utterance does not correspond to the prompt and the determined activity rate is less than a predetermined activity rate.

2. The method of claim 1, further comprising:

determining at least one product that the customer participating in the transaction has ordered; and wherein the step of outputting comprises:

outputting, to the operator of the point-of-sale terminal, a prompt comprising an instruction to offer an additional product to the customer, wherein the additional product is selected for inclusion in the prompt based on the at least one product.

3. The method of claim 1, wherein the step of outputting comprises:

outputting, via a headset worn by the operator of the point-of-sale terminal, an audio prompt indicating a message to be spoken by the operator during the transaction.

4. The method of claim 1, wherein the step of outputting comprises:

outputting, via a display area associated with the point-of-sale terminal, a textual prompt indicating a message to be spoken by the operator during the transaction.

5. The method of claim 1, wherein the step of outputting comprises:

outputting, via a display area associated with the point-of-sale terminal, a graphical representation indicating a message to be spoken by the operator during the transaction.

6. The method of claim 5, wherein the graphical representation comprises a graphical representation of a product to be offered to a customer participating in the transaction.

7. The method of claim 1, wherein the step of determining whether the utterance corresponds to the prompt comprises:

determining whether the operator properly uttered a message indicated by the prompt.

8. The method of claim 1, wherein the prompt comprises an indication of a message to be spoken to a customer participating in the transaction.

9. The method of claim 1, further comprising:

determining data associated with the operator; and determining the prompt to output to the operator based on the data.

10. The method of claim 9, wherein the step of determining the prompt comprises:

determining a level of complexity of the prompt based on the data.

11. The method of claim 10, wherein the step of determining a level of complexity comprises:

determining a level of complexity of a message the operator is directed, via the prompt, to utter to the customer participating in the transaction.

12. The method of claim 9, wherein the step of determining data comprises:

determining a level of authorization of the operator.

13. The method of claim 9, wherein the step of determining data comprises:

determining at least one characteristic of the operator's speech pattern.

14. The method of claim 9, wherein the step of determining data comprises:

retrieving, based on an identity of the operator, data associated with the operator as stored in a memory.

15. The method of claim 14, further comprising:

determining the identity of the operator.

16. The method of claim 15, wherein the step of determining the identity comprises:

determining the identity of the operator based on a recognition of a voice of the operator.

17. An apparatus, comprising:

a processor, and a storage device that stores a program for directing the processor;

the processor being operative with the program to:

perform the method of claim 1.

18. A computer readable medium encoded with instructions for directing a processor to:

perform the method of claim 1.

19. A method, comprising:

outputting, to an operator of a point-of-sale terminal, a prompt instructing the operator to utter a message to a customer participating in a transaction at the point-of-sale terminal;

receiving an audio signal indicative of an utterance of the operator;

determining, based on the audio signal, whether the operator properly uttered the message;

determining an activity rate; and pausing the transaction if it is determined that the operator did not properly utter the message and the determined activity rate is sufficiently low.

20. The method of claim 19, wherein the prompt comprises an instruction to utter an offer for a product.

21. The method of claim 19, wherein the step of outputting comprises:

outputting, via a headset of the operator of the point-of-sale terminal, a verbal command directing the operator to provide an offer for a product during a transaction.

22. The method of claim 19, wherein the step of receiving an audio signal comprises:

receiving an audio signal indicative of words spoken by the operator.

23. The method of claim 22, wherein the step of determining whether the operator properly spoke the message comprises:

determining whether the words spoken by the operator are essentially words the operator was directed, by the prompt, to speak.

24. The method of claim 19, wherein the step of determining an activity rate comprises:

measuring an activity rate of the point-of-sale terminal.

25. The method of claim 19, wherein the step of determining an activity rate comprises:

determining an activity rate of at least one point-of-sale terminal different from the point-of-sale terminal of the transaction.

26. The method of claim 19, wherein the step of determining an activity rate comprises:

determining an activity rate of an establishment in which the point-of-sale terminal is located.

27. The method of claim 19, wherein the step of pausing the transaction comprises:

preventing a cash drawer of the point-of-sale terminal from opening if the audio signal does not correspond to the prompt and the determined activity rate is less than a predetermined activity rate.

28. The method of claim 19, further comprising:

storing an indication of whether the audio signal corresponds to the prompt in association with an indication of the operator to whom the prompt was output.

29. The method of claim 19, further comprising:

causing compensation to be provided to the operator based on the determination of whether the audio signal corresponds to the prompt.

30. The method of claim 19, wherein the step of determining, based on the audio signal, whether the operator properly uttered the message comprises:

determining whether a volume with which the operator uttered the message is at least a minimum volume.

31. An apparatus, comprising:

a processor, and a storage device that stores a program for directing the processor;

the processor being operative with the program to:

perform the method of claim 19.

32. A computer readable medium encoded with instructions for directing a processor to:

perform the method of claim 19.

* * * * *